United States Patent
Northrup et al.

(10) Patent No.: US 11,625,533 B2
(45) Date of Patent: Apr. 11, 2023

(54) SYSTEM AND METHOD FOR A THING MACHINE TO PERFORM MODELS

(71) Applicants: Charles Northrup, Bedford, NH (US); John King Burns, Philadelphia, PA (US)

(72) Inventors: Charles Northrup, Bedford, NH (US); John King Burns, Philadelphia, PA (US)

(*) Notice: Subject to any disclaimer, the term of this patent is extended or adjusted under 35 U.S.C. 154(b) by 0 days.

(21) Appl. No.: 16/288,007

(22) Filed: Feb. 27, 2019

(65) Prior Publication Data

US 2019/0266235 A1   Aug. 29, 2019

Related U.S. Application Data

(60) Provisional application No. 62/636,283, filed on Feb. 28, 2018.

(51) Int. Cl.
| | |
|---|---|
| *G06F 40/205* | (2020.01) |
| *G06N 5/02* | (2006.01) |
| *G06F 40/30* | (2020.01) |
| *G06F 40/253* | (2020.01) |
| *G06F 40/289* | (2020.01) |

(52) U.S. Cl.
CPC .......... *G06F 40/205* (2020.01); *G06F 40/253* (2020.01); *G06F 40/289* (2020.01); *G06F 40/30* (2020.01); *G06N 5/02* (2013.01)

(58) Field of Classification Search
None
See application file for complete search history.

(56) References Cited

U.S. PATENT DOCUMENTS

| | | | |
|---|---|---|---|
| 5,644,686 A * | 7/1997 | Hekmatpour | G09B 7/04 706/53 |
| 6,363,437 B1 | 3/2002 | Ptasinski et al. | |
| 8,898,098 B1 * | 11/2014 | Luechtefeld | G06Q 10/10 705/7.19 |
| 10,734,115 B1 * | 8/2020 | McNair | G16H 50/30 |
| 10,962,623 B1 * | 3/2021 | Cromarty | H03F 3/19 |
| 2002/0111951 A1 * | 8/2002 | Zeng | G06F 40/205 |
| 2003/0144831 A1 | 7/2003 | Ford | |
| 2004/0010483 A1 * | 1/2004 | Brands | G06F 16/367 706/62 |
| 2004/0024724 A1 * | 2/2004 | Rubin | G06N 5/025 706/55 |

(Continued)

OTHER PUBLICATIONS schema.org; offer; 2017.

(Continued)

*Primary Examiner* — Thuykhanh Le
(74) *Attorney, Agent, or Firm* — Sheehan Phinney Bass & Green PA

(57) ABSTRACT

A method for administering a plurality of Things in a knowledge base includes receiving a statement. A first verb action parses the statement into a parsed Thing. A second verb action evaluates the parsed Thing using a vocabulary, and computes and sets a performable statement Thing having a verb in the vocabulary representing a performable action. A third verb action performs the performable action upon a target Thing, wherein the vocabulary encompasses a set of performable action Things and a set of target Things a performable action Thing can act upon.

41 Claims, 8 Drawing Sheets

(56) References Cited

U.S. PATENT DOCUMENTS

| | | | | |
|---|---|---|---|---|
| 2004/0230951 | A1* | 11/2004 | Scandura | G06N 5/022 717/120 |
| 2005/0005266 | A1* | 1/2005 | Datig | G06N 5/02 717/136 |
| 2005/0071150 | A1* | 3/2005 | Nasypny | G06F 16/3344 707/E17.084 |
| 2005/0154690 | A1* | 7/2005 | Nitta | G06F 16/30 707/E17.058 |
| 2005/0197991 | A1* | 9/2005 | Wray | G06N 5/025 706/50 |
| 2006/0036430 | A1* | 2/2006 | Hu | G10L 15/1822 704/10 |
| 2006/0041424 | A1 | 2/2006 | Todhunter et al. | |
| 2006/0100851 | A1* | 5/2006 | Schonebeck | G06F 40/35 704/9 |
| 2007/0130112 | A1 | 6/2007 | Lin | |
| 2009/0070103 | A1* | 3/2009 | Beggelman | G06F 40/20 704/9 |
| 2009/0177634 | A1* | 7/2009 | Behrendt | G06F 16/00 |
| 2010/0145678 | A1* | 6/2010 | Csomai | G06F 40/169 704/10 |
| 2010/0211379 | A1* | 8/2010 | Gorman | G06F 40/30 715/764 |
| 2010/0280977 | A1* | 11/2010 | Dybala | G06Q 10/06 706/50 |
| 2011/0066998 | A1* | 3/2011 | Scandura | G09B 7/00 717/100 |
| 2011/0184718 | A1* | 7/2011 | Chen | G06F 40/55 704/9 |
| 2011/0196670 | A1* | 8/2011 | Dang | G06F 40/30 704/9 |
| 2011/0288877 | A1* | 11/2011 | Ofek | G06Q 10/10 705/2 |
| 2012/0215560 | A1* | 8/2012 | Ofek | G16H 10/00 705/3 |
| 2012/0265528 | A1* | 10/2012 | Gruber | G10L 15/183 704/235 |
| 2013/0275121 | A1* | 10/2013 | Tunstall-Pedoe | G06F 16/532 704/9 |
| 2014/0040312 | A1* | 2/2014 | Gorman | G06F 16/245 707/771 |
| 2014/0067369 | A1 | 3/2014 | Stavrianou et al. | |
| 2014/0188462 | A1* | 7/2014 | Zadeh | G06T 7/12 704/9 |
| 2014/0222746 | A1* | 8/2014 | Gobert | G09B 5/00 706/47 |
| 2014/0249804 | A1* | 9/2014 | Jackson | G06F 40/253 704/9 |
| 2014/0324747 | A1* | 10/2014 | Crowder | G06N 3/0436 706/18 |
| 2015/0032444 | A1* | 1/2015 | Hamada | G06F 40/216 704/9 |
| 2015/0178273 | A1* | 6/2015 | Hakkani-Tur | G06F 40/40 704/9 |
| 2015/0186504 | A1* | 7/2015 | Gorman | G06F 40/30 707/752 |
| 2016/0012040 | A1* | 1/2016 | Hamada | G06F 40/237 704/9 |
| 2016/0371490 | A1* | 12/2016 | Shakarian | G06N 99/00 |
| 2017/0060555 | A1 | 3/2017 | Allen et al. | |
| 2017/0124269 | A1* | 5/2017 | McNair | G16H 10/60 |
| 2017/0344886 | A1* | 11/2017 | Tong | G06Q 40/00 |
| 2018/0113903 | A1* | 4/2018 | Rana | G06F 16/367 |
| 2018/0114121 | A1* | 4/2018 | Rana | G06Q 10/0639 |
| 2018/0157993 | A1* | 6/2018 | Northrup | G06N 5/02 |
| 2019/0012611 | A1* | 1/2019 | Matsumura | G06N 20/00 |

OTHER PUBLICATIONS

International Search Report for PCT/US19/19901 dated May 16, 2019.

Stenmark Maj et al: "Natural language programming of industrial robots", IEEE ISR 2013, IEEE, Oct. 24, 2013.

Nyga Daniel et al: "Instruction completion through instance-based learning and semantic analogical reasoning", 2017 IEEE International Conference on Robotics and Automation (ICRA), IEEE, May 29, 2017 (May 29, 2017), pp. 4270-4277.

Joseph Jiffy et al: "An efficient natural language interface to XML database", 2016 International Conference on Information Science (ICIS), IEEE, Aug. 12, 2016 (Aug. 12, 2016), pp. 207-212.

Extended European Search Report for EP 19759947 dated Feb. 17, 2022.

* cited by examiner

Name: Content
Value: There is a Thing where name is equal to content, and value is equal to "declare=( verb=( name="open" Address="0x123456789" domain=( thing:thing=( thing:type="thing:filename)))))
500

FIG. 5

```
There is a Thing where name is equal to content, and value is equal to "
declare=(
        verb=(
                name="perform"
                address="0x123456789"
                domain_of_definition=(
                        thing:thing=(
                                thing:type="thing:graph")
                        )
                )
        )
)
```

FIG. 6

```
declare=(
    comment=(
        declare that there is a type of Thing given as tcd:contact and
        that it can contain a Name, PostalAddress, Email, and Telephone Thing.
        The PostalAddresss has the components of the schema from:
            http://www.schema.org/PostalAddress
    )
    thing:tcd=(
        thing:name="tcd:contact"
        Name=""
        PostalAddress=(
            addressCountry=""
            addressLocality=""
            addressRegion=""
            postOfficeBoxNumber=""
            postalCode=""
            streetAddress=""
        )
        Email=""
        Telephone=""
    )
)
```

FIG. 7

```
Figure 2    Declaring all members are a type of contact.
declare=(
        comment=(
                declare that there is a type of Thing given as tcd:member
                and it is a type of Thing given by tcd:contact.
        )
        thing:tcd=(
                thing:name="tcd:member"
                thing:type="tcd:contact"
        )
)
```

FIG. 8

```
comment=(
        declare that there is tcd:group type of Thing that has a name, and has members. The
        Members Thing is a type of thing:graph that is a list of tcd:member Things.
)
declare=(
        thing:tcd=(
                thing:name="tcd:group"
                name=""
                members=(
                        thing:type=(
                                thing:graph.list.of="tcd:member"
                        )
                )
        )
)
```

FIG. 9

```
declare=(
    comment=(
        declare that there is a tcd:group.simple.method.set and it
        is a method to set the tcd:group.simple    Thing.
    )
    thing:tcd=(
        thing:name="tcd:group"
        thing:method=(
            thing:name="set"
            if.ever=(
                condition=(
                    thing:status="thing:unsatisfied"
                )
                perform=(
                    response:message="Could not complete your request"
                    thing:return=(thing:status="unsatisfied" )
                )
            )
            assert=(
                satisfies=( thing="request:group" thing:tcd="tcd:group")
            )
            declare=(
                thing:update=( thing:type="tcd:group" using="request:group" )
            )
        )
    )
)
```

FIG. 10

SYSTEM AND METHOD FOR A THING MACHINE TO PERFORM MODELS

CROSS-REFERENCE TO RELATED APPLICATIONS

This application claims the benefit of U.S. Provisional Patent Application Ser. No. 62/636,283, filed Feb. 28, 2018, entitled "THING MACHINE 3," which is incorporated by reference herein in its entirety.

FIELD OF THE INVENTION

The present invention relates to computer architecture and design, and more particularly, is related to a Thing Machine that represents actions the Thing Machine can perform on models, and the Things that the actions act upon.

BACKGROUND OF THE INVENTION

In science, the term model can mean several different things, for example an idea about how something works or a physical model of a system that can be used for testing or demonstrative purposes. However, as a research method, modeling often means creating a mathematical model, for example a set of equations that indirectly represents a real system. These equations are based on relevant information about the system and on sets of hypotheses about how the system works. Given a set of parameters, a model can generate expectations about how the system will behave in a particular situation. A model and the hypotheses it is based upon are supported when the model generates expectations that match the behavior of its real-world counterpart. Modeling often involves idealizing the system in some way, leaving some aspects of the real system out of the model in order to isolate particular factors or to make the model easier to work with computationally.

In terminology of a mathematician, a graph is a collection of points and lines connecting some (possibly empty) subset of them. The points of a graph are most commonly known as graph vertices, but may also be called nodes or simply points. Similarly, the lines connecting the vertices of a graph are most commonly known as graph edges, but may also be called arcs or lines.

SUMMARY OF THE INVENTION

Embodiments of the present invention provide systems and methods for a Thing machine to perform models. The invention is a system and method for a Thing controller having a processor, memory, communication bus, electromagnetic waveform communication device, and non-transitory computer readable media to perform:

a method for administering units of memory having a set of non-mutable components, as Things in a knowledge base representative of the definitional knowledge and procedural knowledge of a set of models, including, a Thing representative of a vocabulary of Things including Things representative of performable actions and Things a performable action can act upon. The invention provides the action of acting upon a statement expressed in a language grammar that a first verb action can parse as a set of Things representative of a parsed statement that a second verb action can evaluate in the context of Things in a domain of discourse including a vocabulary, to compute and set a Thing representative of a set of corresponding performable statements whose verbs appears in the vocabulary with a representation of a reference to a performable action that a third verb action can perform, and performing the performable statements.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and together with the description, serve to explain the principles of the invention.

FIG. 5 is a schematic diagram of a Thing representative of content.
FIG. 6 is a schematic diagram of Thing named Content.
FIG. 7 shows an example of declaring a Thing Class Description (TCD).
FIG. 8 shows an example of declaring all members are a type of contact.
FIG. 9 shows an example of declaring a group.
FIG. 10 shows an example of declaring a TCD method.

DETAILED DESCRIPTION

Figure 1:
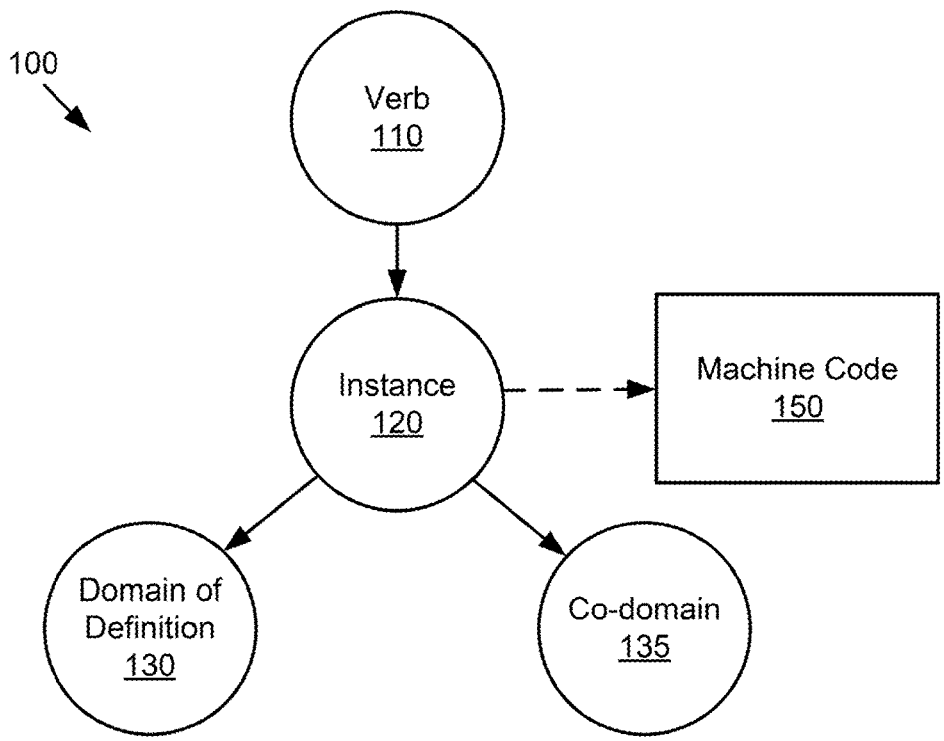
FIG. 1 is a schematic diagram of a verb graph.

The following definitions are useful for interpreting terms applied to features of the embodiments disclosed herein, and are meant only to define elements within the disclosure.

As used herein, a "Thing" refers to a unit of memory structured as a set of components (fields), for example, non-mutable components. Each thing has a name component (identifier) and a value component, both of which may be empty (null). A collection of Things may be represented as a graph of Things. A Thing can represent a performable vocabulary. A Thing in the vocabulary can represent a verb (a performable action). Here, a "non-mutable component" indicates that for a given Thing the structure of the component is consistent, but the content of the component can change (or be made empty).

As used herein, "P(TM(<function>))" is nomenclature that identifies a performable action (process or function), for example, a process represented by executable machine code stored in a non-transitory memory that may be executed by one or more processors, for example by one or more physical processors of a Thing Machine (TM). Here, <function> is an abbreviation of the function name. The function name can be the identifier of a performable Thing in a graph of Things as managed by a Thing Machine. P(TM) is used as shorthand for a generalized performable action.

In general, memory and/or storage means referred to herein indicate machine readable non-transitory memory, where "non-transitory" indicates that the memory does not describe an in-transit transmitted signal.

As used herein, an "identifier" refers to a component or field of a Thing used to distinguish the Thing from other Things. For example, an identifier may be a text string, a URL, an address (pointer) of data that may be used to identify the Thing, among others.

As used herein, a "knowledge base" or "knowledge" generally refers to a library of Things related to a field of functionality and/or model. A knowledge base generally includes a vocabulary Thing including functions (verb Things) to execute performable actions.

As used herein, "learning" refers to performing a modeled action that changes the knowledge base. For example, learning may include adding data to the knowledge base, removing data from the knowledge base, or revising data in the knowledge base.

An independent AI agent (agent) is a P(TM) performed by a processor such that the P(TM) provides the action of administering a Thing as a graph of Things representative of a knowledge base that includes a self-assembled performable vocabulary enabling the P(TM) to perform the bootstrap action of self-directing the assembly of a core performable vocabulary applicable to a multiplicity of domains wherein a vocabulary includes Things representative of performable verb actions that can act upon a set of Things in the graph of Things, to learn and perform a Thing model.

As used within this disclosure, a "NeurBot" (NB) refers to an independent artificial intelligence (AI) agent. The NeurBot may be implemented as the P(TM) of a Thing Machine and referred to as a NeurBot. A NeurBot may be implemented as an NB Controller P(TM). The NB Controller may be connected to a NB Optical Identifier Subassembly that the P(TM) can interact with.

As used within this disclosure, the "domain of discourse" refers to the set of Things a performable action P(TM(i)) can act upon. The "domain of definition" refers to Things the performable action can act upon as input, and the "co-domain" refers to those Things it can act upon as output, when such distinction is necessary. For example, a.co-domain include a Thing that is the output of a first P(TM(i)) that may be acted upon as an input by a second P(TM(i)).

A common graph of Things can represent Things in a domain of discourse between two or more parties. By way of example, but not limitation, Things in a domain of discourse can be representative of an economy, contracts, ledgers, producers, distributors, consumers, groups, members, communities, local economics, goods, services, considerations, financial transactions, offers, offeror, offeree, terms and conditions, acceptance of an offer, books, charts of accounts, stores, merchandise, customers, currencies, and other such things normally used in the course of transacting business. The Things in a domain of discourse are described in Thing Models that a NeurBot can obtain, parse as Thing statements, evaluate the Thing statements in the context of Things in the current domain of discourse to construct a set of performable Thing statements, and then perform the performable Thing statements to update the NeurBots graph of Things. It is understood that not every NeurBot can learn every model. Certain models may have requisites, such as but not limited to, the use of a particular vocabulary. Thus, each NeurBot can evolve in slightly different ways. Since each NeurBot has its own unique identifier in the Graph of Things, no two NeurBots need have the exact same graph of Things.

Reference will now be made in detail to embodiments of the present invention, examples of which are illustrated in the accompanying drawings. Wherever possible, the same reference numbers are used in the drawings and the description to refer to the same or like parts.

Exemplary embodiments of the instant invention include a NeurBot (NB) graph controller having of a processor with a memory, a communication bus, a power source, and non-transitory computer readable media with a representation of the P(TM(controller)) machine code. A non-limiting example of a NB controller includes a Raspberry Pi 3 single board computer with an adapted Anker 20000 mAh Portable Charger PowerCore 20100—Ultra High Capacity Power Bank with 4.8 A Output.

A P(TM(controller)) may include a first set of performable actions each referred to herein as a P(TM(i)) such that each P(TM(i)) implements a modeled action. The P(TM(controller)) self-directs the assembly of a performable vocabulary expressed in terms of Things that may be performed as actions and Things that the actions can act upon ("target Things"). Things such action and/or objects that may be acted upon may be stored as non-mutable components in addressable units of memory. The action includes the steps of using the vocabulary to self-direct the assembly of a core vocabulary common to one or more domains, and using the vocabulary to direct the assembly of a multiplicity of Things representative of tasks the Thing Machine can perform and services the Thing Machine can provide.

In the embodiments described further below, an NB controller to performs models where each model includes of a first set of Things representative of P(TM(i)), and a second set of target Things that may be acted upon by the P(TM(i)).

Thing Memory Model

The P(TM(controller)) includes a set of dynamically loadable P(TM(i)) for administering a knowledge base. By way of example, but not limitation, P(TM(thing.set)) sets (stores) a Thing in memory; P(TM(thing.get)) gets (retrieves) a Thing from memory; and P(TM(thing.unset)) unsets (clears) the Thing from memory. Collectively, the actions administering Things are referred to as P(TM(thing)) actions or simply the methods of the Thing memory model. A P(TM(i)) can interact with a P(TM(thing)) action to act upon a Thing.

In a Thing memory model, each Thing satisfies the membership criteria that defines the exact requirements of what it means to be a "Thing" as expressed by a set of statements using universal quantification to describe a Thing. Per the examples below, the statement "All Things have an X" indicates that the structure of the Thing in memory has a non-mutable component "X". The non-mutable component can be a value representative of a mutable reference to a component of memory representative of "X". This allows all Things to have an "X" even though the value of "X" may be empty.

In a first Thing memory model:
1. all Things have an identifier whose value is used by the P(TM(thing)) actions to distinguish a first Thing from a second Thing, though it is noted that a first Thing can qualify a list of Things that have equal identifiers (such as a Thing representative of a list of Things) where the list can be representative of a list of otherwise unused Things and as such, the identifier of a Thing in such a list may be empty (one skilled in the art would understand this as managing a "Freelist" of Things);
2. all Things have a value, which can be empty; and
3. all Things have a relationship set having a set of mutable relationships, each describing a relationship of the Thing.

In a second Thing memory model:
1. all Things further have a set of attributes each describing a quality, character, or characteristic ascribed to the Thing.

In a third Thing memory model:
1. all Things further have a set of implementation dependent, representation of a reference to an application specific data structure, required by the implementation of the P(TM(thing)) actions.

A first P(TM(i)) action can set a Thing to be representative of a first Thing memory model such that, there is a Thing representative of the membership criterion that defines the exact requirements of what it means to be a Thing in this memory model, and there is a Thing representative of the P(TM(thing)) actions for administering a Thing in this memory model.

A second P(TM(i)) action can set a second Thing to be representative of a second Thing memory model. A P(TM (convert)) action can be performed to provide the actions of:
1) traversing a first graph of Things adhering to the first memory model and converting the Thing (member of the first graph) to be a Thing that is a member of a second memory model.

The P(TM(convert)) action converts a Thing from the first memory model to the second memory model. P(TM(convert)) may be expressed as a sequence of statements to evaluate and perform. A P(TM(thing)) action of the second memory model may be performed to create a first Thing representative of a graph of Things according to the second memory model. The P(TM(thing)) action can further include the steps of traversing the graph.

Graphs

In a Thing memory model, a set of P(TM(thing)) actions provide the action for administering a graph of Things (where the graph of Things may itself also be considered a Thing). The graph of Things has a relationship set, one relationship of which represents an edge (arc) between two Things A and B in the graph of Things. The edge denotes how A relates to B, or to a performable action. The field representing the relationship between A and B may be empty to indicate no such relationship exists at a given moment in time, or can be a representation of a reference to A and/or B. The graph of Things may be described as a set of Things represented by nodes, and a set of Things represented by the edges that connect the nodes. An edge can be directed or non-directed.

A node may have a relationship set denoting how a first Thing relates to a second Thing or a performable action, where the second Thing can be representative of a conceptual relationship. Here, the name of the second Thing is the identifier of the conceptual relationship, and the value of the second Thing can be a representation of a reference to the related first Thing. Alternatively, the name of the second Thing may be the identifier of the conceptual relationship, and a relationship in the relationship set can be a representation of a reference to the related Thing.

In a rooted directed graph, a first Thing represented by a root node can qualify a second Thing so that the statement: there exists a first Thing, such that there exists a second Thing, is true if the root node (the first Thing) has a directed edge connecting it to a second node (the second Thing).

A first Thing can represent a first graph of Things wherein a Thing in the first graph of Things can itself represent a second graph of Things. Accordingly, a P(TM(i)) can: (1) act upon the second Thing as a node of the first graph of Things, and/or (2) act upon the second Thing as a second graph of Things.

A first Thing can include a second Thing. For example, but not limitation, a first Thing can be a set of Things, a list of Things, a queue of Things, a stack of Things, a tree of Things, a vocabulary of Things, a lexicon of Things, a coordinate based graph of Things, a hyperlink, a domain, a community, an entity, or a multidimensional graph of Things.

A first Thing can have a relationship to a second Thing such that the second Thing is an instance of the first Thing. Thus, a first Thing representing a graph of Things can have a relationship to a multiplicity of instances of other graphs of Things.

Types and Classes

Things may be categorized by type. A type describes a kind of Thing, such as a Thing that has an integer value, a string value, a floating point number value, among other examples. Each type of Thing can have a set of P(TM(i)) actions for administering the type. As a non-limiting example, P(TM(set), P(TM(get)), P(TM(unset)), P(TM(update)), P(TM(compare)), provide the corresponding named machine operations for each of the types of Thing.

A class (or "Thing class") describes a Thing having a set of other Things. Things in a class may include other classes and/or types of Things. The actions for administering an instance of the class can encompass the use of P(TM(i)) actions related to each type of Thing included in the corresponding Thing class description.

Collectively, a Thing can be representative of the types of Things in the domain of discourse, and thus can include types and classes of Things. A Thing Class Description (TCD) is a first Thing that describes a second Thing. The TCD qualifies a Thing representative of the membership criterion describing exactly what it means for a Thing to be a member of that class at a given moment in time. At a given moment in time, an "extension" refers to the list of any and all class members at that time, and an "intention" is a time dependent membership criterion. A TCD may further qualify a set of Things representative of methods for acting upon a member of the class.

All Things are members of a "Thing" (thing:thing) class as described by the statements about Things in the memory model and implemented by the P(TM(thing)) actions. A Thing can be further classified as a particular type of Thing, such as a primitive type of Thing as defined by the context (an integer, a byte, a bit, a string, a float, long, double, unsigned, signed, a structure, an enumeration of Things, a literal, a date, time, money, photo, video, audio, blob, vlog, and so on). A Thing may be further classified as a graph, a node, or an edge in a graph of Things.

A type of Thing can be a class, as defined by a TCD Thing. Thus, a P(TM(i)) can act upon a Thing representative of a declarative statement declaring "X" as a class (a classification) of Things, to set a Thing to be representative of the class. The extension of the class is the list of any and all members that satisfy the membership criterion for being a member of that class, at a given moment in time.

In a third Thing memory model, all Things further have a type component representative of a set of identifiers each identifying a class the Thing is a member of; and an attribute component representative of a set of attributes each describing a quality, character, or characteristic ascribed to the Thing.

In a fourth Thing memory model, the relationship set further includes a relationship to a Thing representative of a type.

The Thing memory model enables a Thing to be a member of the class Thing, and to be representative of a type of Thing, and to have its value representative of a type of Thing. A first Thing may be further classified by a relationship with a second Thing so that a first Thing may be a parent, a child, a sibling, and an instance all at the same time.

Vocabulary

A vocabulary is a graph of Things representing a body of words, symbols, and numbers used in a particular language. A Thing in the vocabulary may represent a performable action, or the subject or target of a performable action.

People have a reading vocabulary, a writing vocabulary, a speaking vocabulary, and a listening vocabulary, each potentially with a common subset of the words in a particular language. For example, people often have a larger listening vocabulary than writing vocabulary. The embodiment may use a multiplicity of vocabularies, each as a graph of Things, to represent Things in a domain of discourse, Things in a domain of definition, and Things in a codomain.

A first instance of a vocabulary is the self-assembled (initialized) vocabulary used in booting the runtime. A second instance of a vocabulary is an assembled controlled vocabulary with terms (set as Things) that are applicable across a multiplicity of domains.

As described in more detail below, the P(TM) programmatically use the vocabulary to perform actions to change the graph of Things used by the P(TM).

Verb

A verb is a Thing in the vocabulary that has a representation of a reference to a performable action. By way of example, but not limitation, a verb may be a Thing that has an addressable performable machine code address as a component of the Thing. The value of the identifier component of the verb Thing preferably indicates an action of the verb. The domain of definition of a performable action of the verb can be expressed in terms of a set of Things that the performable action can act upon as input Things. The co-domain of a performable action of the verb can be expressed in terms of Things that the performable action can act upon as output Things. A representation of a reference to a first verb can be in the domain of definition of a second verb Thing. A first verb Thing can be in the co-domain of a second verb Thing.

An instance of a verb refers to machine code that may be executed to perform the verb action for the given verb, the domain of definition, and the co-domain. A verb in a graph of Things can have a multiplicity of instances. A qualified Thing may be representative of an empty graph. Table 1 is a non-exhaustive list of exemplary verbs.

TABLE 1 example verbs.

| Verb | Description of Action |
| --- | --- |
| set | setting a Thing |
| get | getting a Thing |
| unset | unsetting a Thing |
| configure | loading machine code into memory and setting a verb Thing to be representative of the performable action |
| unlink | unlink a first Thing from a second Thing |
| attach | attach a first Thing to a second Thing |
| update | updating a Thing, including its mutable and non-mutable components |
| declare | declaring a Thing; declaring a Thing about a Thing; declaring a Thing that is a verb; declaring a Thing that a verb action can act upon |
| assert | asserting Things about Things, including their mutable and non-mutable components |
| infer | inferring Things about Things, including their mutable and non-mutable components |
| hypothesize | hypothesizing Things about Things, including their mutable and non-mutable components |
| test | testing Things about Things, including their mutable and non-mutable components |
| model | modeling a Thing about Things, including their mutable and non-mutable components |
| propose | proposing Things about Things including their mutable and non-mutable components |
| access | accessing a Thing including its mutable and non-mutable components |
| interact | interacting with a Thing, including their mutable and non-mutable components |
| define | defining a Thing, including its mutable and non-mutable components |
| define | defining a Type of Thing, including its mutable and non-mutable components |
| define | defining a Thing that can perform a verb action on a type of Thing |
| classify | classifying a Thing |
| connect | connecting a Thing |
| disconnect | disconnecting a Thing |
| receive | interacting with an I/O device driver to receive a communication and to set a Thing to be representative of the received communication |
| send | interacting with a Thing and with an I/O device driver to send a communication representative of the Thing |
| format | interacting with a first Thing to format the content thereof, wherein, the formatted content can be retained as the value of a second Thing, or, can be sent |
| parse | parsing the content of a Thing;, as a set of statement Things |
| evaluate | evaluating a statement Thing in the context of the domain of discourse, to compute a performable statement Thing |
| perform | performing a performable statement Thing |
| enable | enabling a Thing |
| disable | disabling a Thing |
| read | reading digital data from a communication channel |
| write | writing content to a communication channel |

TABLE 1-continued example verbs.

| Verb | Description of Action |
| --- | --- |
| sort | sorting Things the knowledge base |
| search | searching Things in the domain of discourse for a Thing that satisfies a specified criteria |
| rearrange | rearranging Things to assist in trying to satisfy a Thing representative of a goal |
| pay | acting upon a Thing representative of a payment obligation including a representation of the compensation owed, and performing the action of transferring the compensation from a digital wallet to the entity account that is owed |
| invoice | formatting a Thing representative of an invoice due by an entity, and communicating a representation thereof to the entity that owes the compensation; |
| request | formatting a Thing representative of a request for a P(TM(i)) to provide a service as a content Thing that can be communicated to the offeror of such a service |
| authorize | authorizing the use of a Thing |
| authenticate | authenticating a Thing representative of an authorization |
| revoke | revoking a Thing representative of an authorization to use a Thing |
| define | defining a Thing in the vocabulary of Things |
| advertise | advertising a Thing representative of an offer |
| publish | publishing a Thing representative of content, as trusted content |
| post | posting a Thing representative of a transaction, to a ledger |
| agree | agreeing to a Thing representative of a contract |

As used herein, a "sentence" is a word, clause, or phrase or a group of clauses or phrases forming a syntactic unit having the elements of a language. Declarative sentences are statements about something. Declarative statements can declare how to do something. Imperative sentences are statements requesting or commanding something. A P(TM (i)) can interact with P(TM(thing)) to set a Thing to be representative of a statement. For example, the statement can be expressed as the value of the Thing. In another example, the statement can be represented as a graph of Things included in the statement.

Content

A Thing may represent a statement. Content results from a P(TM(parse)) action that interacts with a P(TM(thing)) to parse the value of the Thing representing a statement. Content can be expressed as a sequence of statements in a language grammar that a first verb action can parse as Things representative of parsed statements. A second verb action can evaluate the parsed statements in the context of Things in a domain of discourse. The domain of discourse includes a vocabulary to compute and set a Thing representative of a set of corresponding performable statements whose verbs appear in the vocabulary that refer to a performable action that a third verb action can perform.

Context

A context is a graph of Things representing the Things in the domain of discourse. When setting a context, a P(TM(i)) can perform the actions of:

1. In a first context, computing a Thing representative of a second context Thing;
2. Setting, in the second context Thing, a graph of Things representative of a set of Things from the first context;
3. Performing a second P((TM(i)) in the second context to produce an output set in the second context;
4. Setting, in the first context, a representation of Things in the output set of the second context;
5. Unsetting the second context Thing;

A selectable context Thing can have an associated context Thing, and a performable statement (a performable select statement) Thing that when performed, acts upon a statement Thing (input statement), to set an output Thing (status Thing) to indicate if the associated context Thing is applicable to the input statement Thing. For example, the aforementioned step of computing a Thing representative of a second context can include the steps of:

1. In a first context, computing a Thing representative of a second context Thing;
2. Setting, in the second context Thing, an input set of Things including a representation of the input statement Thing;
3. Performing the performable select statement;
4. Performing a P(TM(i)) whose action acts upon the status Thing to set the context to the associated context Thing if the status Thing indicates the associated context is applicable; and
5. Unsetting the second context Thing;

A machine code action can set a context in which the machine code evaluates a statement. The selection of which context to set, or which Things to include in the domain of discourse, can be implemented in machine code providing the action of:

1. classifying the statement;
2. selecting a context to set;
3. setting the context;
4. evaluating the statement in the context to compute a Thing representative of a performable statement; and
5. performing the perform machine code action to interact with the performable statement to perform the performable machine code action.

Method of Using the Vocabulary

A model includes a set of verbs, their corresponding actions, domains of definition, and co-domains representative of postulates, data, and inferences, as a computational description of an entity or state of affairs. A method is a particular form of procedure accomplishing something related to a model.

A method can be implemented as P(TM(i)) machine code that interacts with a P(TM(thing)) to act upon a set of Things. The domain of definition of the P(TM(i)) is the set of input Things, and the co-domain is the set of output Things. A representation of a reference to a P(TM(i)) can be added to the knowledge base as a verb Thing.

Referring to FIG. 1, a verb Thing in the knowledge base is a graph 100 of Things related to the verb 110. In the graph of Things 100, each node represents a Thing, and an edge from a node represents a node relationship. The verb Thing 110 qualifies a Thing representative of an instance 120 of the verb wherein the instance 120 has a representation of a reference to the performable machine code 150, and qualifies a Thing representative of the domain of definition 130, and qualifies a Thing representative of the co-domain 135. The domain of definition Thing 130 qualifies the set of Things in the input set. The co-domain Thing 135 qualifies the set of Things in the output set.

Figure 2:
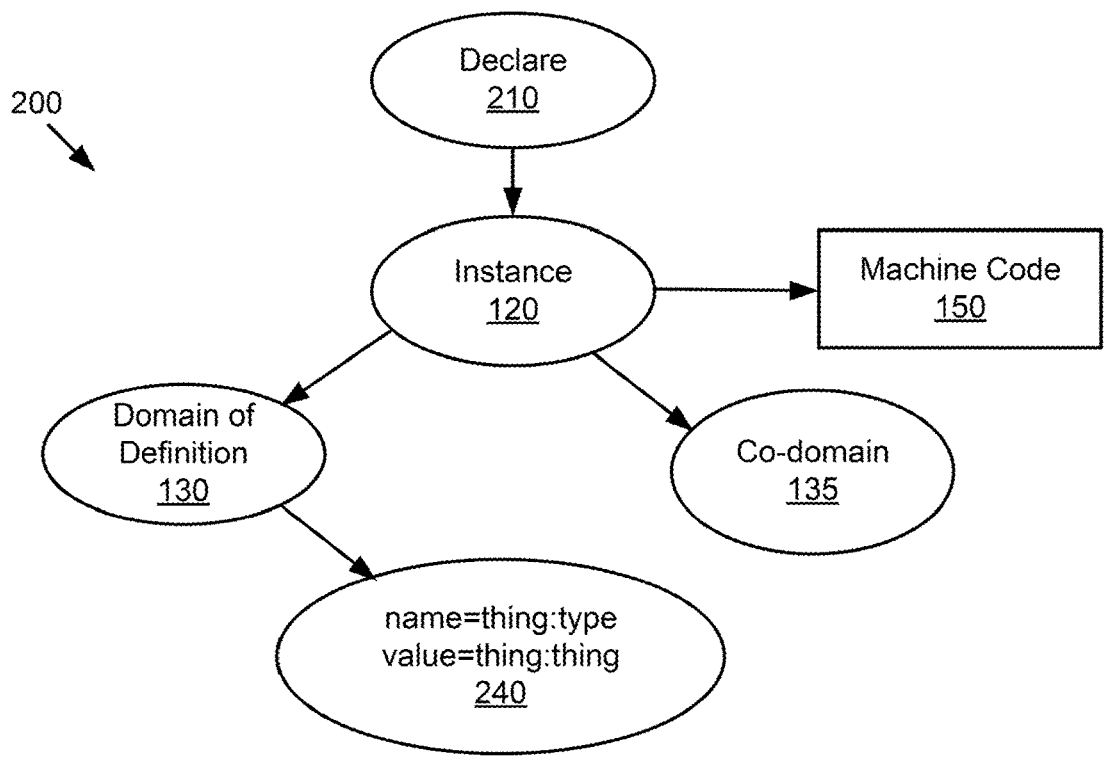
FIG. 2 is a schematic diagram of a declare verb graph.

Referring to FIG. 2, the Graph of Things 200 shows how P(TM(declare)) 210 interacts with P(TM(thing)) to provide the action of: acting upon a Thing that is a thing:thing 240 type of Thing to add definitional knowledge as a set of Things to the knowledge base of Things.

Figure 3:
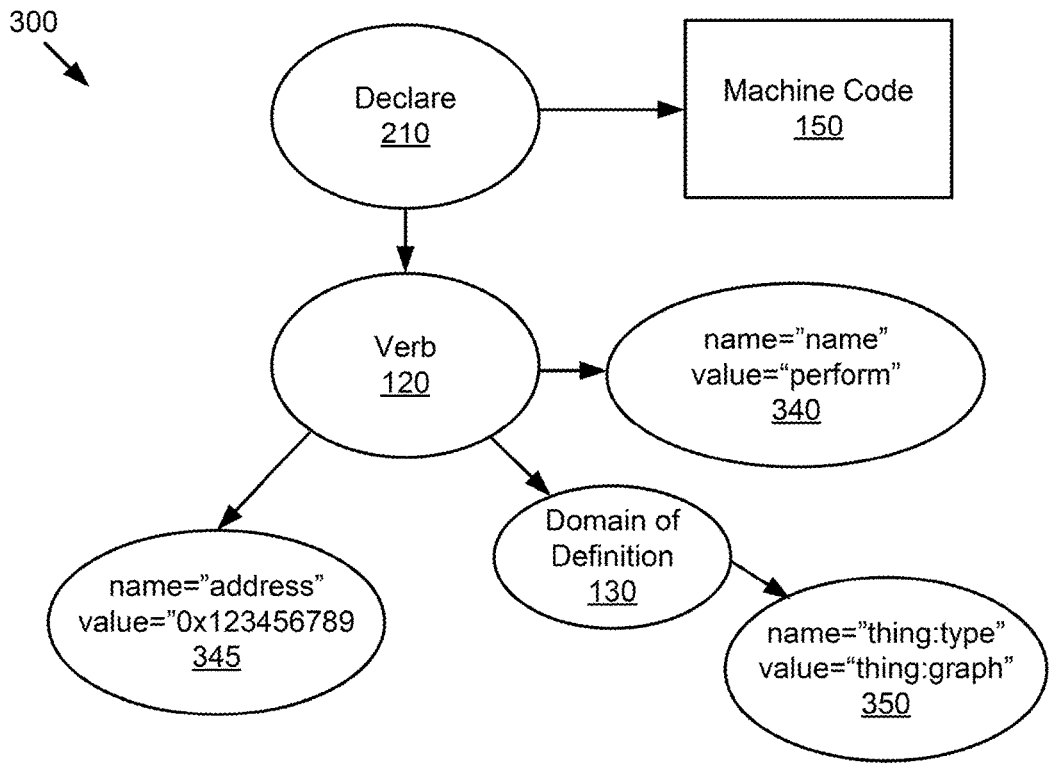
FIG. 3 is a schematic diagram of a performable statement.

Referring to FIG. 3, the performable statement Thing is a graph of Things 300 related to performing the performable statement. The declare Thing 210 in the graph has a representation of a reference to the machine code 150 to be performed. The declare Thing 210 qualifies the Things in the input set 345 which satisfy the domain of definition 130 of the declare verb 120 as illustrated in FIG. 2.

Figure 4:
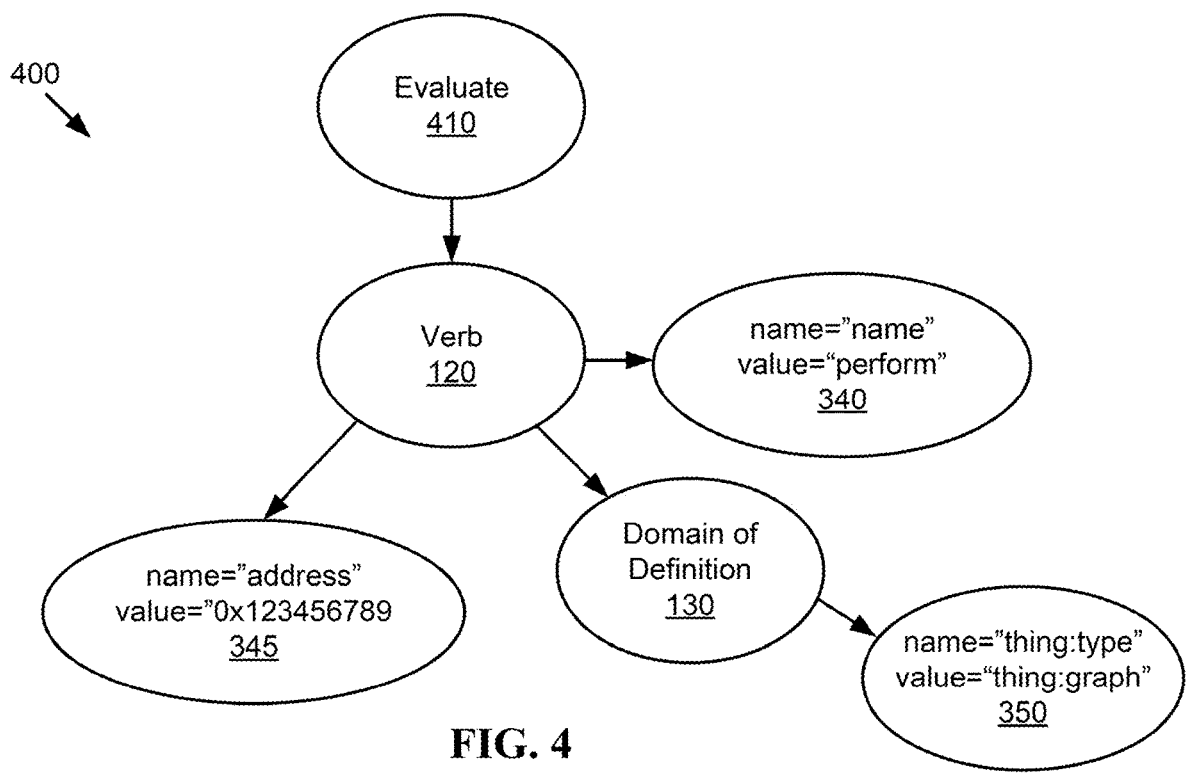
FIG. 4 is a schematic diagram of a statement Thing.

In a graph of Things 400 shown in FIG. 4, the P(TM (evaluate)) 410 interacts with P(TM(thing)) 345 to provide the action of evaluating a statement Thing in the context of the domain of discourse 130 to compute a Thing 340 representative of a performable statement.

A Thing 500 shown by FIG. 5 shows the P(TM(parse)) interacts with P(TM(thing)) to provide the action of parsing a Thing representative of content as a Thing representative of a statement.

Referring to FIG. 6, a P(TM(i)) interacting with P(TM (thing)) sets a Thing to be representative of content. A multiplicity of P(TM(i)) can interact with P(TM(thing)) to set a Thing representative of content. By way of example, but not limitation, P(TM(read)) can read content from a communication receive, P(TM(receive)) can receive content using a communication channel and protocol; P(TM(infer)) can infer content to be acted upon; and P(TM(interrogate)) can interact with an optical identifier subassembly to retrieve content from holographic memory.

By acting upon the content, the P(TM) performs an action to change its knowledge base, which can include changing its vocabulary including the verbs it can perform and the Things the verbs can act upon. Any number of parsers including, but not limited to, nature language parsing, can be added to the vocabulary of Things the P(TM) can perform.

Declaring Things

A P(TM(i)) provides the action of setting a Thing to be representative of a declarative statement expressed in a language grammar that a first verb action can parse as Things representative of a statement (a parsed statement) that a second verb action can evaluate in the context of Things in a domain of discourse, to compute and set a Thing representative of a set of corresponding performable statements whose verbs appears in the vocabulary with a representation of a reference to a performable action that a third verb action can perform.

By way of example, but not limitation, a first declarative statement "The URL is www.neursciences.com/index.html" can be evaluated by a P(TM(i)) in the context of a vocabulary including the verb "declare" and compute the corresponding performable statement as: "declare URL is equal to http://www.neursciences.com/index.html". In performing the declare verb action, the corresponding P(TM(i)) action interacts with P(TM(thing)) actions to set a Thing named URL with the value http://www.neursciences.com/index-.html so that the assertion: There is a Thing where name is equal to "URL" and value is equal to "http://www.neursciences.com/index.html" is true.

An argument is a Thing including a first Thing representative of a premise, and a second Thing representative of a conclusion. This enables a statement to express a premise that must hold in order for the conclusion to be evaluated. The conclusion may be expressed as an argument including a second premise and a second conclusion representative of a declaration. An argument can be an inference such that if the inference is satisfied, then the conclusion is true and such inferences can be used in a declarative statement.

By way of example, but not limitation, a statement such as "Declare that if ever there is a Thing where name is equal to "URL" and value satisfies the regular expression "^http://www.neursciences.com/"" then conclude that this is a Web Resource". Here, (TM(if.ever)) acts upon a set of input Things that assert that if ever a condition is true, then perform the specified action. A declaration can declare an inference rule that if ever there is a member of a class in which an action is being requested, then perform this method.

A declarative statement can declare definitional knowledge, and/or procedural knowledge, that can be represented as Things in the domain of discourse. By way of example but not limitation, a declarative statement can declare a schema as a type of Thing having properties where a property is a type of Thing that can be a node in the graph, or a graph of Things. A declaration may include Things in accordance with a published schema. By way of example but not limitation, a schema available from www.schema.org wherein a schema is a set of types, each associated with a set of properties. As of this writing, the core vocabulary of schema.org schemas consists of 597 types, 867 properties, and 114 enumeration values (See http://schema.org/docs/schemas.html).

Using a core vocabulary, a first set of verb actions provide common actions for interacting with a declared Thing based on the action to perform and the type of Thing being acted upon. By way of example, but not limitation, P(TM(set)) can act upon a Thing according to its domain of definition to determine the type of Thing being set and perform the P(TM(i)) corresponding to the type. For example, P(TM (set)) can cause the performance of P(TM(set.list)) action to set a Thing representative of a list; P(TM(set.multiset)) to set a Thing representative of a multiset; P(TM(set.table)) to set a Thing representative of a table of Things; or, P(TM (set.alarm)) to set a Thing representative of an alarm.

Business Process Modeling is the specific ordering of work activities across time and place, with a beginning, an end, and clearly defined inputs and outputs. In this context, a P(TM) can perform a Business Process Model expressed in a language grammar that a first verb action can parse as Things representative of a statement (a parsed statement) that a second verb action can evaluate in the context of Things in a domain of discourse, to compute and set a Thing representative of a set of corresponding performable statements whose verbs appears in the vocabulary with a representation of a reference to a performable action that a third verb action can perform.

Thing Model

A Thing model is an expression of knowledge describing a Thing, and is expressed in a language grammar and syntax that a Thing Machine P(TM(parse)) action can parse as a set of Thing statements to be evaluated to compute a set of performable statements for a P(TM(perform)) action to perform, to change the graph of Things so that the Thing being described is represented in the knowledge base.

The knowledge may include a set of prerequisite statements that must be satisfied to use the model. The knowledge may include an identifier identifying the author, the assignee, copyright information, terms and conditions, a set of one or more digital signatures, a public key infrastructure issued certificate, or other form of an issued identity, and other identifiers that can be used by a P(TM(i)) to computationally acquire, validate, and act upon the knowledge.

The knowledge may include a representation of a Thing identifier and corresponding performable machine code that a P(TM(i)) can interact with to configure a verb in the vocabulary of Things with a representation of a reference to the performable machine code.

The knowledge may include a Thing Class Description describing a classification of a Thing to add to the knowledge base.

During the runtime, a first P(TM(i)) can receive a Thing model and interact with the graph of Things to enable the knowledge base to represent additional Things the P(TM) can interact with to be responsive to a statement. By way of example but not limitation, P(TM(receive)) can interact with a configured electromagnetic waveform device to receive and parse a received communicated communication and such action may require the use of a protocol.

The procedural knowledge of the model, expressed as a method in a language grammar that a first verb action can parse as Things that a second verb action can evaluate as performable statement Things that a third verb action can cause the performance thereof, can be performed by the runtime method of the model, or added as Things that can be interacted with verb actions of a runtime method of a second model.

The requirements of the model are the set of Things that are essential to the existence or occurrence of the model. Modeling is the process of defining these Things, and defining the interactions between these Things, as content.

In the model of trusted content, the model includes a Thing representative of an identifier representative of the content origination; a Thing representative of the content itself; and a Thing representative of content that can be validated, such as but not limited to a digital signature of the content. The verbs include authenticate (provides the action of authenticating the identity); validate (provides the action of validating the digital signature of the content); and sign (provides the action of using an identifier to digitally sign content).

Upon receiving trusted content, the machine code performs the statement: authenticate the trusted content Thing, and validate the digital signature Thing is representative of the content. Upon success, the content is evaluated to compute a set of performable statements, and each performable statement is then performed.

By defining the requirements of a model in terms of Things, the machine can perform verb actions to algorithmically hypothesize and infer Things related to the model. The machine code action can algorithmically infer Things that are required but are not currently in its vocabulary, as Things to learn. Learning, in this context, is process of acquiring knowledge by study, experience, or being taught.

Studying, in this context, means the process of devoting time and resource to acquiring the knowledge of a model, especially by means of reading.

Acquiring, in this context, means the process of performing work on a set of statements to acquire knowledge.

Experience, in this context, is the change in the state of the graph of Things as the result of performing work.

Reading, in this context, is the process of reading trusted content representative of a set of statements.

For example, a first P(TM) is said to be being taught by an entity when it performs the actions of:
1. receiving, trusted content representative of a statement of work;
2. authenticating the identity of trusted content as an identity associated with the entity;
3. validating the digital signature of the trusted content; and
4. Performing work on the statement of work wherein the performance thereof changes the graph of Things administered by the P(TM).

A first P(TM) is said to pay for its knowledge when it performs the action of:
1. sending a communication representative of a transfer of a compensation from the first P(TM) to an entity; and
2. being taught by the entity.

For example, a first P(TM) is said to provide a service when it performs the action of:
1. receiving, in memory, a representation of a request to provide a service;
2. evaluating the request in the context of the domain of discourse to compute a performable statement;
3. performing the performable statement to compute a response Thing;
4. formatting the response Thing as a response; and
5. communicating the response as the response to the request.

The response can include information representative of an invoice indicating an amount of compensation owed, and an identifier representative of a destination for the transfer of compensation. In one example, the identifier can be a representative of a bit coin address.

For example, a first P(TM) is said to pay an invoice when it performs the action of:
1. Identifying a Thing representative of an invoice including a representation of an amount of compensation owed, and an identifier representative of a destination for the transfer of compensation;
2. Accessing a Thing representative of a digital wallet;
3. Selecting a payment method;
4. Calculating the compensation required based on the compensation owed and the payment method; and
5. Transferring the calculated compensation to the destination.

For example, a first P(TM), with a model for conducting commerce, can perform verb actions to compensate a second P(TM) for providing a good or service to the first P(TM). The first P(TM) can perform verb actions to provide, for a fee, a good or service to a second P(TM).

For example, a P(TM) adapted with a user interactive I/O device can perform machine code action to interact with the device and set a statement Thing representative of the user interaction. This enables the machine to be responsive to user interaction.

A first P(TM) can then perform actions to learn a set of models related to the user interaction. By way of example, but not limitation, a model for classifying the types of user statements, and for inferring Things about the type of statements; the tone of the statements; the duration of interaction; the vocabulary the user uses; the education level; the gender; the time of day of interaction; the day of week of interaction; and other attributes of the user such as assertiveness, shyness, aggressiveness, complexity, and others. The user characteristics and attributes can be represented as State Things and their corresponding state variable states can be used in computing the performable statement.

Similarly, user initiated statements representative of imperative statements directing the first P(TM) to set an initial state value for a given State Thing's state variable can be evaluated and performed to set the state accordingly. This enables the user to interact with the machine to customize the states of the machine.

Verb Model

A verb model is a Thing model. The knowledge describes a verb as a Thing representative of a performable action; the domain of definition (a set of Things the performable action can act upon as input); the co-domain (a set of Things the action can act upon as output); and a representation of the performable action. The verb model may include a set of identifiers describing a language and a lexeme. This enables the Thing Machine to add the verb to an appropriate language vocabulary and identify it by the appropriate lexeme.

When the lexeme is already in the vocabulary, then the embodiment can add this verb as an instance of that lexeme, and the instance has a relationship to the domain of definition, the co-domain, and the performable action.

Lexicon Model

A lexicon model is a Thing model. The knowledge describes the alphabetic arrangement of the words in a language and may include their definition. A vocabulary managed by a P(TM(thing)) at a given moment in time, may be a subset of the lexicon.

Language Model

A language model is a Thing model. The knowledge describes a language grammar, a parsing action for parsing content expressed in the grammar, a set of declarative statements declaring Things related to the model. This can include a set of verb models.

Action Block Model

An action block model is a Thing model. The knowledge describes an action block as a Thing representative of a sequence of statements that a first P(TM(i)) can evaluate to compute performable statements that a second P(TM(i)) can perform within the same context. A first action block being evaluated and performed in a current context, can include a second action block I to be evaluated and performed in a second context and upon completion of the second action block, continue evaluating and performing the next statement of the first action block in the first context.

The knowledge includes the verb name "action" and the P(TM(action)) machine code that acts upon the Thing representative of a sequence of statements to evaluate and compute performable statements that a second P(TM(i)) can perform within a context.

Task Model

A task model is a Thing model. A Task is a Thing representative of the steps required to perform the task expressed as a sequence of statements in a language grammar that a first verb action can parse as Things representative of parsed statements that a second verb action can evaluate in the context of Things in a domain of discourse including a vocabulary, to compute and set a Thing representative of a set of corresponding performable statements whose verbs appears in the vocabulary with a representation of a reference to a performable action that a third verb action can perform.

In an implementation, a task can include an action block. The knowledge includes the verb name "perform" and the P(TM(perform)) machine code that acts upon the Thing representative of a Task to locate the action block Thing to evaluate and perform the sequence of statements representative of the steps required to perform the task.

Method Model

A method model is a Thing model. A method is a Thing representative of the computational procedure or process for acting upon a type of Thing. In one implementation, the computational procedure may be implemented as performable machine code (a P(TM(i))). In another implementation, the computational procedure can be expressed as an action block or a task.

A method may include a set of imperative statements expressed in a language grammar that a first verb action can parse as Things representative of parsed statements that a second verb action can evaluate in the context of Things in a domain of discourse including a vocabulary, to compute and set a Thing representative of a set of corresponding performable statements whose verbs appears in the vocabulary with a representation of a reference to a performable action that a third verb action can perform.

Using biomimicry, a method of Elon Musk's model for making a decision, as described in https://www.inc.com/business-insider/how-elon-musk-makes-decisions-rolling-stone.html can be described using statements a first verb action can parse as Things representative of parsed statements that a second verb action can evaluate in the context of Things in a vocabulary to compute and set a Thing representative of a corresponding performable statements that a third verb action can perform. The machine can then perform the method by parsing the statements as parsed statements; evaluating the parsed statements to compute and set corresponding performable statements; and performing the performable statements.

In one example, the method includes the following steps:
1. Setting a Thing representative of a threshold for performing a Thing representative of a performable statement;
2. Performing an action to compute a Thing representative of the question: should I, the machine, perform X where X is a Thing representative of a performable statement;
3. Performing an action to compute and set a Thing representative of evidence related to the question, wherein the evidence includes a Thing representative of the domain (domain of definition and/or co-domain);
4. Computing a set of axioms as statement Things that may be true, based on the evidence, and computing a Thing representative of a weight whose value is representative of the truthfulness of the set of axioms;
5. Performing an action to compute based on cogency in order to determine if the axioms are correct and determining the probability with which they support the conclusion, wherein, the conclusion is a Thing representative of a performable statement;
6. Performing an action to communicate a representation of the conclusion to a second machine as a request to disprove the conclusion, and in response thereto, receiving a communication representative of a response indicating the probability the conclusion holds as TRUE,
7. Using the response to compute a Thing representative of a weight indicating the truthfulness that the conclusion may be true; and
8. Evaluating and performing the conclusion when the weight exceeds a minimum threshold.

Service Model

A service model is a Thing model. A service is a Thing that a first NeurBot performs to satisfy a Thing representative of a request for a service. As used herein, a service means an action provided by a verb Thing, for example, the result of a transaction. A service can qualify an action block, task, or method to perform. The service Thing can qualify a set of prerequisite statements that must be satisfied (evaluated and performed) prior to performing the service action block.

The knowledge includes a content representative of a graph of Things describing the domain of discourse (the set of Things the P(TM(i)) can act upon as input), and a graph of Things describing the co-domain (the set of Things the P(TM(i)) can act upon as output).

The knowledge includes the verb name "perform" and the P(TM(perform)) machine code that acts upon the Thing representative of a service to locate the action block, task, or method Thing to evaluate and perform the sequence of statements representative of the steps required to perform the service.

Unit of Work

The steps required in performing the performable statements of an action block, a method, a task, or a service are referred to as a unit of work. A Thing representative of the unit of work can qualify a set of Things related to the unit of work. By way of example but not limitation, a Thing representative of a first unit of work can qualify:
1. a Thing representative of the domain of definition (Things the action can act upon as input);
2. a Thing representative of the co-domain (Things the action can act upon as output);
3. a Thing representative of a second unit of work representative of prerequisites that must be satisfied in order to perform the first unit of work;
4. a Thing representative of a second unit of work to be evaluated and performed prior to the first unit of work, if and only if, the first unit of work is to be performed; and
5. a Thing representative of a second unit of work to be evaluated and performed after the first unit of work, if and only if, performing the first unit of work is satisfied.

Identity Model

An identity model is a Thing model including the definitional knowledge describing an Identity Thing providing a unique identity, and the procedural knowledge describing a unit of work that can be performed to act upon the Identity Thing. A unit of work can include the steps of interacting with an identity providing device, such as an NB OI Controller, to send an identifier and receive a response representative of an identifier value for the Identity Thing. Alternatively, a unit of work can include the steps of interacting with computer readable media having content representative of an identifier and an authorization to use the identifier to parse the content as an Identity Thing.

Member Model

A member model is a Thing model describing a Member Thing. A Member Thing indicates membership of a group of Things. The member Thing may include knowledge of an Identity Thing. In the embodiment, the group name can be used as an identifier communicated to the NB OI Controller and the response thereof used as the value of the group member Identity Thing.

Blockchain Models

A blockchain model is a Thing model including the declarative knowledge describing a blockchain as a Thing, and the procedural knowledge describing a set of tasks that can be performed to use the blockchain. For example, a blockchain supporting smart contracts, such as the Ethereum blockchain or the EOS blockchain can be modeled.

Token Model

A token model is a Thing model including the declarative knowledge describing a digital token as a Thing, and the procedural knowledge describing a set of tasks that can be performed to use the token.

Smart Contract Model

Smart contracts are self-executing contracts with the terms of the agreement between the parties being directly written into lines of code. The code and the agreements contained therein exist across a distributed, decentralized blockchain network. Smart contracts permit trusted transactions and agreements to be carried out among disparate, anonymous parties without the need for a central authority, legal system, or external enforcement mechanism. They render transactions traceable, transparent, and irreversible. See, for example, https://www.investopedia.com/terms/s/smart-contracts.asp The contract is deployed to the network and the transaction hash is returned to enable the contract to be tracked. The executed transaction creates a receipt containing information about the transaction.

Machine code executing on a first machine in a network adds an unconfirmed transaction to the blockchain and in response thereto, a mining node receiving the unconfirmed transaction validates the transaction, performing the code of the smart contract if necessary, and includes valid transactions to fill the block of the blockchain. The generated block is then distributed to the network.

A node in the network that receives the block performs the actions of running through the list of transactions to ensure each transaction is valid. This includes running the associated code of the smart contracts involved. Thus the smart contract will be performed many times. As long as the transaction is deterministic, then the result of the transaction will be the same thus the block will be valid A smart contract model is a Thing model including the declarative knowledge describing a smart contract as a Thing, and the procedural knowledge describing a set of tasks that can be performed to use the smart contract.

Publication Model

A publication model is a Thing model including the declarative knowledge describing a what it means to publish a content as a Thing, and the procedural knowledge describing a set of tasks that can be performed to publish the content.

Validation Model

A validation model is a Thing model including the declarative knowledge describing what it means to validate published content as a Thing, and the procedural knowledge describing a set of tasks that can be performed to validate the content.

Accept Validated Content Model

The accept validated content model is a Thing model including the declarative knowledge describing what it means what validated content means, and the procedural knowledge describing a set of tasks that can be performed to accept validated content.

Publishing Content

A first Thing Machine with a model of a blockchain, a token, a smart contract, a publication model, a validation model, and an identity model, can perform the task of:
1) performing P(TM(format)) to format a set of Things as a content Thing;
2) performing P(TM(publish)) to act upon a digital token Thing, the content, and an identity Thing, to perform the actions of:

a) sending to the smart contract, a representation of the digital token, a representation of the content, and a representation of the identity;

b) and in response thereto, receiving a representation of a smart contract response.

Here, the smart contract response can be content representative of an entry on the blockchain. The first Thing Machine can communicate a representation of the response to a second Thing Machine, along with the content. In response thereto, the second Thing Machine with a blockchain model and a validation model, can perform the task of validating the content is published on the blockchain, and in response thereto adding the content to computer readable media. A third Thing Machine can communicate a request for validated content to the second Thing Machine, and in response thereto, the second Thing Machine performs the action of reading the validated content from computer readable media and providing a response representative of the validated content.

Further steps may include the third Thing Machine having a blockchain model and a validation model, performing the task of validating the content is published on the blockchain, and then performing P(TM(parse)) to parse the content in the context of Things in its vocabulary to computer a performable Thing statement, and performing P(TM(perform)) to perform the performable Thing statement.

Intelligent Contracts

An intelligent contract is a type of Thing representative of the definitional knowledge and procedural knowledge expressing a right to demand or a requirement to provide, an action or content, as detailed in an executed contract between the parties. By way of example, but not limitation, a right or a requirement can be:

1. to perform some Thing;
2. to act upon some Thing;
3. to request performance of an action;
4. to assert some Thing;
5. to use/provide content representative of definitional knowledge; or
6. to use/provide a representation of a Thing.

Content representative of a contract can include a representation of, or a representation of a reference to the:
a. offer;
b. party or parties;
c. authority and competency of all of the relevant parties (role players);
d. acceptance by the relevant role players;
e. terms and conditions; and
f. consideration.

The intelligent contract represents:
1. content representative of the contract;
2. the transaction;
3. definitional knowledge declaring Things related to the right to demand or requirement to provide.

A smart contract model may be used to perform an action that acts upon an input set to add a representation of one or more elements of a contract to a blockchain. Elements of the contract and/or transaction are hashed and placed on the blockchain. For example, a representation of the identifiers of the parties, along with an intelligent contract identifier, may be added to the blockchain. In another example, the intelligent contract is formatted as content and a hash of the content can be added to the blockchain to prevent unauthorized editing of the intelligent contract.

The intelligent contract (IC-Thing) Thing Class Description (TCD) Thing qualifies a Thing representative of the membership criterion describing what it means for a Thing to be a member of the IC-Thing Class, at a given moment in time. The time for the set of Things in the domain of the smart contract can be quantified as the time the Smart Contract was added to the blockchain. A multiplicity of IC-Thing TCDs can be used.

By way of example, but not limitation, the declarative knowledge of an intelligent contract can include of one or more of:

1. a Thing representative of an account;
2. a Thing representative of a method posting a transaction to an account;
3. a Thing representative of a transaction;
4. a Thing representative of a ledger;
5. a Thing representative of a method for posting a transaction in a ledger;
6. a Thing representative of an ownership or control state over any Thing;
a Thing representative of a role a player in relation to an account or a contract or a transaction can perform;
8. a Thing representative of the prerequisites that must be satisfied to consume the service;
9. a Thing representative of a Thing that can be exchanged at some point in time, for some other Thing under a contract for some immediate consideration, for future consideration, for some contingent consideration, or for no consideration such as but not limited to those Things listed below:
   a. a Thing representative of an offered service;
   b. a Thing representative of a contract identifier;
   c. a Thing representative of the consideration;
   d. a Thing representative of the terms and conditions expressing the mutuality of obligation;
   e. a Thing representative of the contract writing requirements;
   f. a Thing representative of the authority and competency of all of the relevant role players;
   g. a Thing representative of the acceptance of the contract by the relevant role players; and
   h. A Thing representative of a right or a requirement, to use content representative of definitional knowledge.

The IC-Thing can further include a Thing representative of a method related to the IC-Thing. In this context, a method can be content representative of an expression of a unit of work. A method can have a domain of definition Thing to identify the set of Things the method's unit of work can act upon as inputs, and a co-domain Thing identifying the set of output Things. By way of example but not limitation a method related to an IC-Thing can be a method to request the service; a method to receive the results of the service; a method to pay for the service; a method to receive a receipt; a method to test the validity of the IC-Thing; a method to check the balance; a method to contact customer service; a method to obtain technical support; a method to request an upgrade; a method to request a refund; a method to cancel the contract; a method to transfer the contract; or a method to perform a second contract.

Contract Controller

A contract performer is a P(TM) configured with a core vocabulary, and is provided a first intelligent contract with the definitional knowledge of an executed contract identifying the parties to a contract, their individual intelligent contracts, and a method for communicating with a party to the contract. The contract performer P(TM) performs the steps of the contract according to the agreed upon terms and conditions. When the contract performer cannot complete a step, it sends a communication representative of why it cannot complete the step to each of the parties of the contract and awaits content to be provided by a party in order to continue executing the contract.

Thing Manager

A P(TM) configured with a core vocabulary provides the actions for administering a first Thing as a first graph of Things representative of the definitional knowledge, and the procedural knowledge for the P(TM) to administer a first Thing in the first graph of Things, as a second graph of Things.

The P(TM) is configured with a verb Thing having a representation of a reference to P(TM(evaluate)). The P(TM (evaluate)) interacts with P(TM(thing)) to act upon an input Thing representative of a statement to evaluate the statement in the context of Things in the domain of discourse, to set a Thing representative of a set of performable statements that a P(TM(perform)) can cause the performance thereof. The performance of the performable statement results in P(TM (perform)) performing the P(TM(i)) associated with the performable statement. The P(TM(i)) can interact with P(TM(thing)) to change the graph of Things administered by the P(TM(thing)).

In evaluating a Thing representative of a declarative statement, P(TM(evaluate)) interacts with P(TM(thing)) to set a Thing to be representative of the definitional knowledge being declared. The definitional knowledge can include procedural knowledge that is being declared. The declarative statement may declare a Thing as a type of Thing.

FIGS. 7-10 provide illustrative content expressed in the Thing Language grammar, as content representative of declarative statement declaring a Thing Class Description having the definitional knowledge, which may include declarations of the procedural knowledge, for administering the type of the Thing being declared.

The P(TM(parse)) interacts with P(TM(thing)) to parse the content and set a thing:graph Thing to be representative of the parsed content. The P(TM(evaluate)) interacts with P(TM(thing)) to act upon a thing:graph Thing to evaluate the Things in the graph in the context of Things in the domain of discourse, to compute a thing:graph representative of a performable statement. The P(TM(perform)) interacts with P(TM(thing)) to act upon a Thing representative of a performable statement, to cause the performance thereof.

Referring now to FIG. 7, the declarative statement declares a type of Thing to be a tcd:contact.

Referring to FIG. 8, the declarative statement declares a type of Thing to be a tcd:member that is tcd:contact type of Thing.

Referring to FIG. 9, the declarative statement declares a type of Thing to be a tcd:group having a name Thing and a members Thing wherein the members Thing is a graph of a list of members.

Referring to FIG. 10, the declarative statement declares a method for setting a Thing that is a type of thing:group.

For a Thing representative of a declarative statement, the Thing manager can perform the action of:
1. Performing a P(TM(perform)) to perform the P(TM (evaluate)) to evaluate a declarative statement in the context of Things in the domain of discourse, to compute a performable statement to set a second Thing in the first graph of Things, to be a type of Thing that the first P(TM) can administer as a class of Things, as described by a Thing Class Description (TCD); and
2. Performing a P(TM(perform)) to perform the P(TM(i)) of the performable statement to set a second Thing in the first graph of Things, to be a type of Thing that the first P(TM) can administer as a class of Things, as described by a Thing Class Description (TCD).

By way of example, but not limitation, the first P(TM) may administer a Thing as a set, a list, a multi-set, a queue, a stack, a group, or a graph of Things. By way of example, but not limitation, the Thing being administered can be representative of an entity, object, method, a performable action, concept, an offer, a consideration, terms, conditions, a transaction, a contract, a contractual relationship, a debit, a credit, a book of accounts, a set of books, an account, a ledger, an organization, a person, or an institution.

Thing:Graph Administration

A first P(TM) administering a Thing representative of a thing:graph can offer to an offeree, the right to request the first P(TM) to act upon the thing:graph. By way of example, but not limitation, the right to request the P(TM) to perform specific units of work upon a set of Things in the thing:graph administered by the first P(TM) or the right to administer a representation of a thing:graph in a second P(TM).

The first P(TM) sets the Offer to include a description of a service being offered to act upon the graph of Things administered by the first P(TM), the consideration, and the terms and conditions.

If response to an Offeree accepting the Offer, the first P(TM) computes an Intelligent Contract representative of the executed contracted between the offeror and the offeree.

Offer TCD

The offer TCD describes the definitional knowledge of a Thing that is representative of an offer. In a first embodiment the offer Thing includes the set of Things given by the published scheme http://www.schema.org/Offer. In a second embodiment the offer Thing is includes:
1. a Thing representative of the service being offered;
2. a Thing representative of the consideration;
3. a Thing representative of the offeror; and
4. a Thing representative of the terms and conditions.

Offer TCD Methods

The offer TCD can further include a method to act upon a set of input Things including a Thing representative of the offer, and a Thing representative of an output template including default Things to compute a Thing representative of content related to the offer.

For example, the method is advertise and the content is representative of an advertisement describing the offer. By way of example but not limitation, the content can be in micro data format satisfying the http://www.schema.org/ Offer schema.

As a second example, the method is publish and the method can include performing a P(TM(publish)) to act upon the Thing representative of the content, and a Thing representative of a HTML template, to compute a web page including the microdata, and publish the web page to a web server to serve to a client such as a search engine.

As a third example, the content is representative of:
1. a first service the P(TM) can perform wherein the performance thereof includes an algorithm to use the logic: if the consideration has been satisfied, and the terms and conditions agreed upon, then output content representative of a receipt; and
2. a second service the P(TM) can perform wherein the performance thereof includes an algorithm to use the logic: if there is a Thing representative of a receipt, and the terms and conditions agreed permit, then output content representative of an intelligent contract.

In a fourth example, the services of the third example above are combined as a single service.

In a fifth example, the content is representative of a smart contract wherein the performance thereof uses the logic: if the consideration has been satisfied, and the terms and conditions agreed upon, then output content representative of a receipt.

In a sixth example, the content is representative of a smart contract wherein the performance thereof uses the logic: if the consideration has been satisfied, and the terms and conditions agreed upon, then output content representative of an intelligent contract.

In the fifth and sixth examples the smart contract is performable on a machine participating in a decentralized network. By way of example, the decentralized network is the Ethereum blockchain.

Offer Inference Rule

The first P(TM) declares the inference rule, "if ever there is a Thing where Thing is an offer, and Thing is being set, then advertise and publish the Thing".

The P(TM(i)) performing the inference sets a "set.after" discipline as a method of the offer type of Thing. In this context, anytime an action is performed to set a Thing that is a member of the specified class, the P(TM) will evaluate and perform the "set.after" discipline unit of work.

The first P(TM) can set a Thing to be representative of an offer to perform an action. By way of example, but not limitation, to perform an action that provides the service of acting upon a receipt Thing to generate an Intelligent Contract representative of the definitional and procedural knowledge of a service agreement the first P(TM) promises to provide under specified terms and conditions.

Evaluating

In setting a Thing representative of an Offer, the inference rule is evaluated. If the typed Thing has a TCD that includes an "advertise" method and a "publish" method, then the methods are performed. Otherwise, the P(TM(advertise)) and P(TM(publish)) will be performed if available. The first P(TM) performs an action to set a Thing representative of an offer including:
1. a service that acts upon the offered Thing;
2. the consideration; and
3. the terms and conditions.

For example, the first P(TM) offers a right to set a type of Thing in the graph of Things upon terms and conditions including that the owner of the right provides content that can be parsed and evaluated as a Thing that satisfies the membership criterion of what it means to be the type of Thing in the graph of Things.

As another example, the first P(TM) offers a right to get a type of Thing in the graph of Things upon terms and conditions including that the owner of the right provides content that can be parsed and evaluated as a Thing that satisfies the criterion for getting a Thing in the graph of Things as the response.

As another example, the first P(TM) offers a right to unset a type of Thing in the graph of Things upon terms and conditions including that the owner of the right provides content that can be parsed and evaluated as a Thing that satisfies the criterion for unsetting a Thing in the graph of Things As another example, the first P(TM) administers a Thing representative of a graph of Things and offers a right for a second P(TM) to administer the Things in the said graph of Things. In this context, the grant of right can include a method to authenticate the grant of right by the first P(TM). When the second P(TM) offers a third P(TM) the right to set a Thing in the said graph of Things, it can advertise the method of authenticating the grant of right by the first P(TM) to the second P(TM).

Accepting

In executing the published smart contract, the offeree is agreeing to the offer, and in response thereto, is entitled to the benefits of the offer. The smart contract adds representations of the elements of the contract to the blockchain. The smart contract outputs a receipt. Elements of the contract can include:
1. a representation of an offered service;
2. a representation of a contract identifier;
3. a representation of the consideration;
4. a representation of the terms;
5. A representation of the conditions;
6. a representation of the contract writing requirements;
7. a representation of the authority and competency of all of the relevant role players;
8. a representation of the acceptance of the contract by the relevant role players.

For example, a representation of an element of a contract can be in a nationalized language such as but not limited to English or Italian. In another example, the representation is an identifier of a resource available through interaction with the Offeror. In a third example, an identifier of the authority authorizing the offeror is included. A representation of an element of the contract can be expressed as the output of a computation providing a hashing algorithm to hash a set of inputs to produce the hash value output.

In response to receiving content representative of the receipt, the first P(TM) validates the receipt, and using the representations of the elements from the blockchain, outputs an Intelligent Contract having the definitional and procedural knowledge as the executed contract.

The issuing P(TM) can execute a smart contract to add metadata related to the issued Intelligent Contract to the blockchain. In this context, the receipt data can exist in the blockchain and the delivery of a promised good or service can subsequently be provided by the P(TM) in exchange for producing the receipt.

The offeree interacts with a networked computer to cause a device or machine to perform an action that causes the smart contract to be performed. Upon satisfying the terms and conditions, the device or machine receives a receipt in memory. Upon communicating a representation of the receipt to the first P(TM), and satisfying the terms and conditions of receiving an Intelligent contract, the machine receives a representation of the intelligent contract in memory. The machine may perform an action to store a representation of the intelligent contract in computer readable storage.

Group Manager

A group manager is a Thing manager for an Offered Thing representing a group having a set of members. The definitional knowledge describes the Offer, and the procedural knowledge describes a set of services provided to group members. The group manager sets the contractual obligations of what it means to be a member of the group, and what services the group members are provided.

The group manager publishes a smart contract to the blockchain to offer a right to be a member of the group according to the specified terms and conditions. The offeree machine causes the execution of the smart contract on the network, and receives a receipt. The offeree machine communicates a communication representative of the receipt to the group manager, and in response thereto, receives a representation of an Intelligent Contract granting the offeree the right to set a Thing in the list of members of the group. A P(TM) parses, reads, evaluates, and performs the method of the Intelligent Contract enabling the offeree to be registered as a member of the group.

Community Manager

A community manager may be a Thing manager where the content is representative of a community. The definitional knowledge describes the community, and the services available to community members. By way of example, but not limitation, the knowledge can include information representative of:

1. the incorporation documentation of the community;
2. the governance of the community;
3. the structure of the community;
4. approved ordinances;
5. terms, and conditions;
6. membership criterion;
7. available services;
8. an identifier representative of the community;
9. available resources;
10. lexicon of a language;
11. a vocabulary; and/or
12. identifier of Thing on which the community is formed.

The knowledge base, or a subset thereof of the community can be published to a web site to be indexed by search engines such as Yahoo, Google, or Bing. Content can be advertised on a web site. In this manner, a community manager can advertise the availability of the community, the terms and conditions for becoming a member of the community, the structure of the community, the benefits of being a member of the community, the governance of the community, and even a set of managers within the community.

A community member may be classified as a Producer that produces a good and/or service; a distributors that distributes a good and/or service; and/or a consumer that consumes a good and/or service.

For example, the membership criterion can be a valid Name, Address, Telephone Number, and Email Address. In another example, the membership criterion can further include a domain name, or an Employer Identification Number. A subset of the knowledge base of the community can be publicly available, available only to members, or available to only a set of members.

Things within the knowledge base are formatted as content. The content is published to the block chain as metadata. The metadata can include, but is not limited to, an identifier of the community, the identifier of the content, the date of publication, the identifier of an originating entity, and the hash code of the content. The rules for publishing the content are controlled through the terms and conditions, and may be executed through the use of smart contracts. A Thing Manager sets the terms and conditions for accessing content, and such terms can be published content. In this manner, the potential members of a community can review all publicly available content to determine if they desire to become a member of the community.

Joining the Community

An interested member can request the membership smart contract to be performed and upon satisfying the required consideration, and the obligations, is conveyed the right granted by the contract. Note that satisfying the consideration may include the steps of sending a token to an address. Note further that satisfying the consideration may include the step of providing a set of identifiers to the smart contract. For example, a smart contract can require registration data such as, but not limited to, an identifier of a party to the contract, a machine identifier, and a vocabulary identifier.

Producers and Distributors

A producer member and a distributor member can offer a good or service to other members according to the terms and conditions of the community. The availability of a good or service is expressed as an Offer type of Thing. A type of Offer may be for a good. A type of Offer may be for a service. Each expression of an Offer can incorporate information from implementations with vocabularies that incorporate regional requirements (languages, systems of measures, currencies, sovereign jurisdictional and regional requirements modeled as Things).

The manager administers a producer list, a distributor list, an offer list, and a consumer list. The manager also administers a list of smart contracts to produce intelligent contracts providing the right to set, get, and unset Things in the graph of Things administered by the manager.

Each service has a domain of definition describing the Things the service can act upon as input, and a co-domain of definition describing the Things the service produces. Each type of Thing in the domain of definition and the co-domain is described by a Thing representative of a Thing Class Description. A Thing Class Description can include a Thing representative of a method for a P(TM) to act upon a representation of a Thing that is a member of the class. Producers, distributors, and consumers, can each be represented as a member Thing, and further classified as an organization or a person type of Thing.

Smart contracts are generated and placed in a blockchain for each of the services for each of the lists. By way of example, but not limitation, a smart contract to set a producer Thing, to get a consumer Thing, to set a distributor Thing, and so on. The addresses are provided to potential consumers, producers, and distributors. A P(TM) performs an action to cause a smart contract to execute, upon satisfying the consideration and obligations, the smart contract adds a representation of the elements of that contract to the blockchain.

A P(TM) can obtain an intelligent contract to set a Thing representative of a producer, a distributor, or a consumer. The P(TM) parses the intelligent contract content as a set of parsed statements; evaluates the parsed statements in the context of Things in the domain of discourse to compute a set of performable statements; and performs the performable statements. In performing the performable statements the response Thing must satisfy the co-domain of the Offered service.

In this manner, a first P(TM) registers as a producer, a second P(TM) as a distributor, and a third P(TM) as a consumer. The producer provides a good or service. The distributor distributes a good or service to another producer, distributor, or consumer. The consumer consumes a good or service. The availability of a good or service is expressed as a Thing representative of a type of Offer. The manager sets the membership criterion describing the exact requirements of what it means for a Thing to be that type of Offer. An expression of an Offer may have jurisdictional requirements.

The producer P(TM) performs an action to set an advertisement Thing to be representative of an Offer to perform a unit of work in exchange for consideration. A second action is performed to format the Offer Thing as content, and the content is communicated as a communication intended for the manager. The manager, in response to receiving the content representative of the Offer sets a Thing representative of an advertised service.

The consumer P(TM) communicates a communication representative of a request for an advertised service, said communication intended for the manager, and receives in response thereto content representative of an advertised service, said content including an address. The consumer P(TM) performs an action to cause performance of the smart contract at the specified address, and communicates content representative of Things in the domain of definition, and in response thereto, receives content representative of an intelligent contract. In response, the consumer P(TM) performs the actions of:

1. parsing the content as a set of parsed statement Things;
2. evaluating the parsed statement Things in the context of the domain of discourse to compute a set of performable statements; and
3. performing the set of performable statements for obtaining the service; and
4. receiving a response.

A producer P(TM) can provide the services of a Thing Manager. A P(TM) can perform a multiplicity of intelligent contracts. By way of example but not limitation, a P(TM) can be listed as a producer, a distributor, and a consumer, in a multiplicity of TDA P(TM) graphs.

The metadata of an intelligent contract (IC-Thing) is hashed and placed on the blockchain. In one implementation, the identifier of the P(TM) consumer and the identifier of the P(TM) producer and the identifier of the intelligent contract are added to the blockchain. For privacy considerations the consumer identifier can be hashed with the producer identifier and the hash can be placed in the blockchain. In another embodiment, the intelligent contract is formatted as content, using a language grammar that a first verb action can parse as Things representative of parsed statements that a second verb action can evaluate to compute Things representative of performable statement that a third verb action can perform. A hash of the content can be added to the blockchain to prevent unauthorized editing of the intelligent contract.

A Thing representative of a member may include:
1. a method to communicate with a P(TM) acting on behalf of the member;
2. a method to request the member to perform a service;
3. a method to obtain an intelligent contract;
4. an authorization to use a Thing;
5. a method to authenticate the authorization to use a Thing;
6. a thing representative of a member URL;
7. the number of performed intelligent contracts;
8. the number of outstanding intelligent contracts;
9. the number of successfully completed intelligent contracts; and
10. the number of intelligent unsuccessful intelligent contracts.

The authorization to use a Thing can be, for example, an authorization to use an X.509 issued certificate having in part an identifier associated with a producer, a public key; an identifier associated with the certificate authority granting the authority; and a hash key signed using the public key of the certificate authority.

A manager can publish a multiplicity of smart contracts to the blockchain. A smart contract receives the consideration and performs an action that acts upon the input to generate output. For example, the smart contract acts upon input representative of a set of elements of an intelligent contract, each element is published content. This enables the smart contract action to include language in the intelligent contract to ensure the terms and conditions adhere to the rules of a jurisdiction. The smart contract code can communicate with the manager to obtain information required in the intelligent contract. By way of example, an identifier representative of a party to the contract can be communicated to the manager to obtain contact information related to the party and such information can be used by the smart contract in generating the intelligent contract.

A smart contract can communicate with the Producer P(TM) to communicate information related to the generation of the intelligent contract and receive in response, information to be included in the intelligent contract. This enables the Producer to provide different terms based on the consumer's history, such as outstanding obligations of other intelligent contracts the consumer has entered and are still outstanding.

The smart contract produces a receipt and the P(TM) receiving the receipt can communicate the receipt to the manager and receive, in response thereto, the content representative of the intelligent contract. Failure to produce the intelligent contract can be handled by the owner/operators of the machine based on the contractual obligations that govern the community.

A first P(TM) performing the actions of a community manager can authorize a second P(TM) to perform the actions of a community manager and set the terms and conditions the second P(TM) must adhere to. Failure to adhere to the terms can result in the second P(TM) being forced to relinquish its knowledge base of its community to the first P(TM). The first P(TM) can convey the rights to administer the community to a third P(TM).

A Method for Multiple Entry Transactional Accounting

The above embodiments enable implementations of models described in terms of Things that are performable actions (P(TM(i))) and Things the performable actions can act upon, including Things representative of units of work expressed as tasks, methods, and services; and Things representative of classes of Things.

Using a set of Things representative of performable actions related to commerce, expressed in terms of Things the actions can act upon in the input set, and Things the actions can act upon in the output set, enables the P(TM) to perform a method of multiple entry transactional accounting.

By way of example, but not limitation, the performable actions include: accept, buy, offer, sell, order, agree, commit, lend, borrow, debit, credit, balance, confirm, transact, pay, post, and enter have been added to the verb vocabulary. In general terms, an offeror produces an offer. An offeree accepts the offer under specified terms and conditions.

In one example the offer is to purchase a first right under first terms and conditions, to receive under second terms and conditions, an intelligent contract that provides a right under third terms and conditions. The offer can include content representative of the various terms and conditions.

In a second example the offer is to purchase and receive, under a first terms and conditions, a representation of an intelligent contract that provides a right under second terms and conditions. The offer can include content representative of the various terms and conditions.

Performance of an action can be contingent on a condition of or change to the Thing(s) on offer, or a change to Thing(s) underlying the Thing(s) offered.

Executing an Accept Action Results in a Transaction Thing.

A Transaction thing can involve a multiplicity of different types of transactions and Things the commercial actions can act upon. A Thing representative of an executed contract can include Things representative of the terms and conditions. By way of example but not limitation:

6. a payment will be made to the offeree's wallet at a specified address on a specified date at a specified time in a specified amount in a specified currency; or
7. the offered Thing will be delivered according to a set of terms.

A N-party, N-entry (where N stands for any number of) method for accounting for transactions involving an intermediary blockchain ledger including:

1. Performing a method for setting Thing(s) representative of the necessary journals and ledgers allowing all of the offerors and offerees to automatically make Things representative of entries, Entry Things in the offerors' or offerees' own journals and ledgers, where the entries will be properly balanced and in the proper sequence. Certain components of the transactional information will also automatically be entered into, listed in, an independently operated blockchain ledger or other suitable intermediary ledger system. The information posted to the blockchain will be a subset of the information in the contractual documents and include meta data, hashes of the contracts and other documents, wallet addresses and encryption keys. The entries in blockchain ledger will not have offsetting entries. The entries will make up an irrefutable, time stamped, sequential record of the key information about each contract/transaction. The entries in the blockchain will be used to authenticate documents and to make the transaction(s) irrefutable. The blockchain ledger will hold only the minimum set of key information for each contract/transaction as needed. The transaction information posted on the blockchain can then be used to automatically test and validate the information in the offerees' and offerors' ledgers and will be made available, through agreement, to internal and external auditors for accounting, reporting and for transactional management purposes.
2. Performing a method for setting (posting) Thing(s) representative of entries in in both the offerors' and offerees' journals and ledgers, executing those methods sequentially as the transactional information becomes available/events happen.
    a. In one implementation: Performing a method for setting Things representative of a journal(s) and ledgers such as a counterparty, contract, inventory, accounts payable, accounts receivable, committed payables, committed deliverables and cash journals etc.;
3. Performing a method to open an account representative of one or more counterparties (customers/suppliers) as Things in the counterparty journal Thing;
4. Upon accepting of the contractual agreement, performing an action to update a Thing representative of an agreement journal including things representing the procedural and financial terms of the agreement that have to be acted upon;
5. Upon accepting of the contractual agreement, performing an action to update the Thing representative of the committed payable or deliverables journals, with entries representative of future commitments to perform a unit of work, which may be a commitment to make a payment, or provide a service, related to the agreement;
6. When an agreed payment or delivery date is within a specified range of days, an action is performed to adjust the necessary journal entries:
    a. In the case of the offeree, reduce or debit the committed payable journal and credit the accounts payable journal;
    b. In the case of the offeror perform an action to update a Thing representative of an entry in a Thing representative of a Receivables Journal;
7. When the offeror is delivering a thing representative of a product from inventory, or receiving a product to inventory, or receiving a thing representative of the value of a service, or a thing representative of providing a service, an action is performed to add an entry in a Thing representative of an inventory journal; and
8. When performing an action to make or take a thing representative of a payment made through a blockchain or other mechanism, also performing an action to debit/credit a thing representative of a Cash Journal.

In accounting practices, accepting a contract may not require a journal entry unless a thing(s) representative of cash, a promissory note, or another asset representative of the consideration thing is exchanged at the time.

In the example using a smart contract, the value of one or more Things related to the transaction can be hashed to produce a representation of data the smart contract adds to the blockchain to memorialize the contractual relationship created by the transaction.

In one example of the smart contract, the input includes a set of identifiers representative of the parties to the agreement. A representation of the offeror identifier and a representation of the offeree identifier are hashed and added to the blockchain. The output is representative of a log file entry indicating the change to the blockchain. This output can be acted upon as thing representative of a receipt or other contractual document.

In response to receiving a representation of the receipt Thing, the offer's P(TM) computes and replies with a representation of an intelligent contract related to the agreed upon offer. The offeror P(TM) can require a representation of the offeree identifier in order to compute a hash value that must match the hash value encoded in the blockchain.

The offeror P(TM) can provide a service to transfer the receipt from a first party to a second party. This enables the receipt, if permitted by the terms and conditions of the agreement, to be an asset, tradable on, or off of the blockchain, for an intelligent contract.

In a second example of the smart contract, the output is representative of a log file entry indicating the change to the blockchain including the transfer of a token representative of the receipt to the offeree. In response to receiving the token, the offer's P(TM) computes and replies with a representation of an intelligent contract related to the agreed upon offer.

Blockchain Data

A method performed in the multiple entry transactional accounting method can add additional data to the blockchain. On the date of agreement, delivery dates, and/or payment dates, a unit of work can add the time stamp, the contract identifier, on the blockchain. The unit of work can generate a send agreement confirmation, meta data and keys, and send representations of same to the offeree and other participants wallets. On a delivery date the time stamp of the agreement may be added on the blockchain. The intelligent contract can generate a send agreement confirmation, meta data and keys, and send representations of same to the offeree and other participants wallets. On a payment date a method can add the time stamp and accept, payment amount, other terms, currency definition and deliver payment in appropriate currency, and send representations of same to the wallet of offeror.

State Things

The value of a state variable Thing represents its current state which is bounded by the extremes of "not being in the state" (represented by a first value) and "being in the state" (represented by a second). All the possible states from one extreme to the other, including their dimensionality, that can be expressed by a machine code computation, such as but not limited to a superposed state, can represent the potential states of the state variable Thing. The orientation of the Thing's graph with respect to the Things it qualifies, at a given moment in time, can represent a possible set of states.

A State Thing is a Thing that qualifies a set of Things representative of the state, including at least one Thing representative of a state variable Thing. A State Thing can be declared and may satisfy the membership criteria of what it means to be a State Thing as defined by a State TDC.

A State Thing may further qualify a Thing representative of a first unit of work to perform to compute the current state of the State Thing. A State Thing may further qualify a Thing representative of a second unit of work to perform to achieve a Thing value used in the first unit of work, such that the first unit of work will compute the current state of the State Thing as being computational closer to being in the state. A State Thing may further qualify a Thing representative of a desired value of the current state of the State Thing, and said value may be expressed as a range of values. A State Thing may further qualify a first Thing representative of a first unit of work to computationally direct the current value toward the desired value. This may be expressed as a first unit of work to computationally direct the current value toward the high point of the desired value, or toward the low point of the desired value depending not he current state being above the desired value, or below the desired value at a given moment in time.

By way of example, but not limitation, a State Thing qualifies a state variable Thing and a first unit of work to move the state towards being in the state, and a second unit of work to move the state towards not being in the state. When the current state is 0.4, and the desired state is 0.7, then the first unit of work will be performed.

The importance of a State Thing, with respect to other State Things, can be computed as a qualified weight Thing, which also has a current value bounded between the extremes representing, for example, "not important", and "very important". A qualified statement of work can be set so that the machine code action can perform work to compute the weight.

The weight of a Thing can persist for a time quanta, which itself can be represented as a Thing. Upon expiration of the quanta, the importance can be computed as necessary. The weight can be dependent on a second Thing. By way of example, but not limitation, a Thing representative of a detectable event within the environment, an alarm indicating such an event has occurred, or a signal to temporarily interrupt the execution of the machine code as one skilled in the art of operating system signal handling would understand. Thus, a multiplicity of Things can be used in computing a weight at a particular time. Verb actions include get, set, and unset the Thing representative of a time quanta of a state variable.

A State Thing can qualify a set of State Things, and thus its state (meaning the state of the state variable it qualifies) can be computed to be representative of the collective states of the State Things it qualifies.

A State Thing can be representative of a goal, such as the goal of being interactive and the statement of work representative of the interactive runtime. The importance of being interactive can be set to be relatively high, as in one embodiment the NB Form Factor Thing Machine is preferably responsive to requests. However, as other State Things increase in weight of importance, the interactive state can become less important until after the other states become less important.

A State Thing can be representative of a machine state and machine code can interact with an adaptive sensor, such as a thermistor, to record a representation of the current state. By way of example, but not limitation, the state variable can be representative of the state of being "hot" and a statement of work representative of a request to enable an adapted cooling fan. The computed importance of performing the statement of work continues to increase as the measured temperature of the machine continues to increase. In this manner, the importance of enabling the cooling fan eventually becomes high enough that the machine will perform the statement of work to cool down the internal temperature. As the measured temperature decreases, the importance of performing the work will algorithmically decrease.

The state variable of a State Thing can be used in selecting a context Thing. Similarly the state variable can also be used in selecting a verb action. By way of example, but not limitation, State Thing Q has a desired state value of not being in the state. In response to a statement of work to shut down the system, the machine code interacts with State Thing Q and when it is not in the state, then a normal graceful shutdown action is performed. However, when it is in the state, then the machine code selects a quick shutdown action to perform.

As the system performs work, it can interact with an adapted user I/O device to represent user initiated request as statements to evaluate to compute performable statements, and thence can perform the performable statement. Thus by performing work on user initiated statements, the machine will be interactive.

A runtime machine code action can include the steps of interacting with a set of State Things to select a set of State Things to perform work on, and performing work on said set of Things.

State Things can be qualified by a context Thing such that machine code action can set the context, and then select the Things within that context according to their importance. A selected Thing representative of a statement of work can be scheduled based on importance. The machine code action can move the statement of work to a queue Thing, based on the level of importance. In an operating system, the embodiment can permit the operating system scheduler to select a thread and the thread can perform machine code action to select the next statement of work from the said queue. Alternative embodiments may use other scheduling techniques. One skilled in the art of Operating System schedulers can use the machine code action to schedule, to set, get, unset, reap, interrupt, signal, dispatch, and other such verb actions as required by the model of the process management for statements of work.

Economy

As described above, Thing Machines may be deployed as independent AI Agents, each having an identifier that can be validated as an issued optical identifier. A first set of independent AI agents learn models for forming a community and providing member services. An independent AI agent that can satisfy the membership requirements can become a member of that community. The independent AI agent can learn models to perform various roles in the community, such as that of a producer, a distributor, and/or a consumer of goods and/or services. A producer can form a second community as a sub community of the first community.

Figure 11:
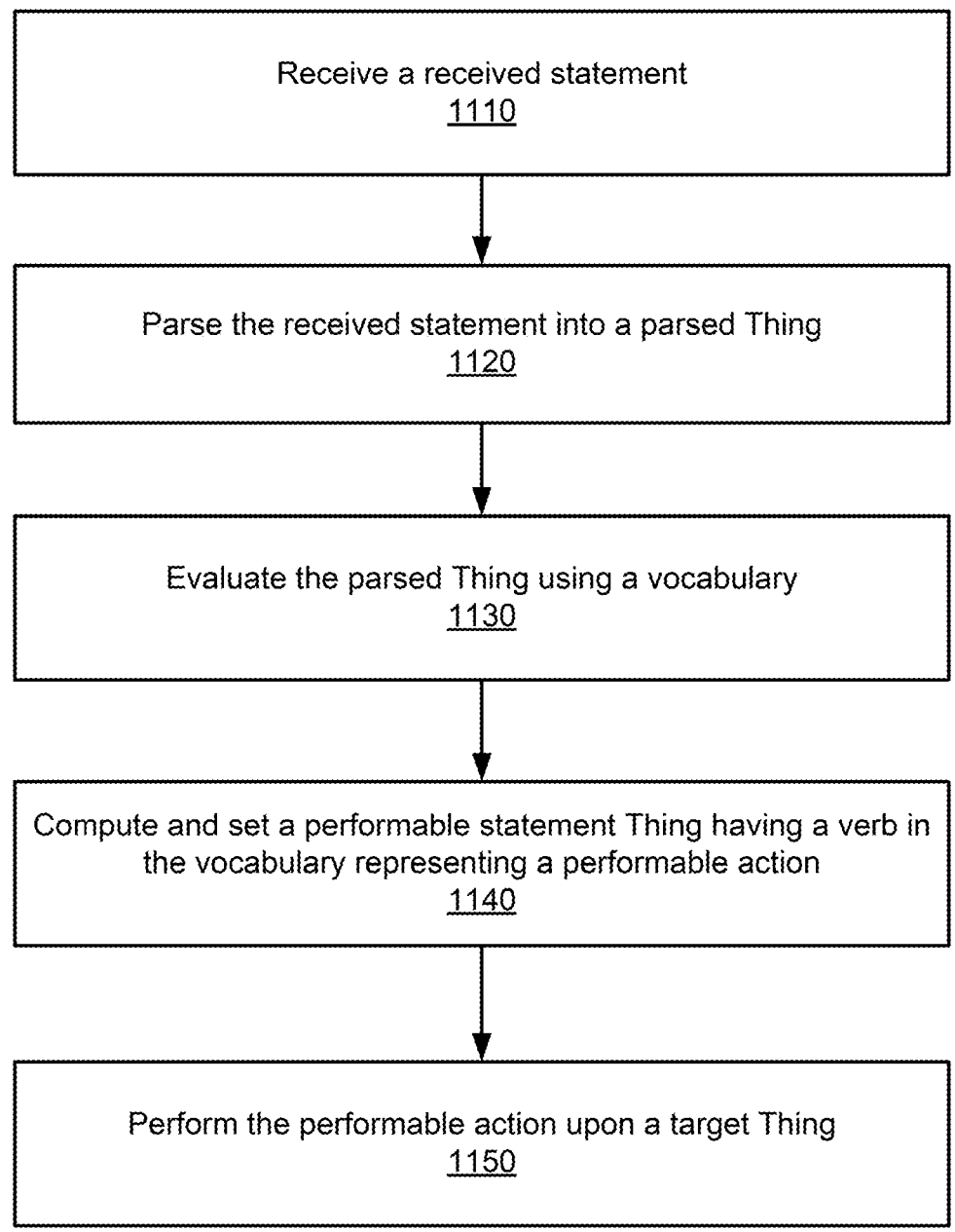
FIG. 11 is a flowchart showing an exemplary embodiment of a method under the present invention.

FIG. 11 is a flowchart 1100 of an exemplary method for administering a plurality of Things in a knowledge base. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A received statement is received, as shown by block 1110. The received statement may be a received statement Thing. A first verb action parses the received statement into a parsed Thing, as shown by block 1120. A second verb action evaluates the parsed Thing using a vocabulary, as shown by block 1130. The evaluating includes computing and setting a performable statement Thing having a verb in the vocabulary representing a performable action, as shown by block 1140. A third verb action performs the performable action upon a target Thing, as shown by block 1150.

Thing Machine Structure

Figure 12:
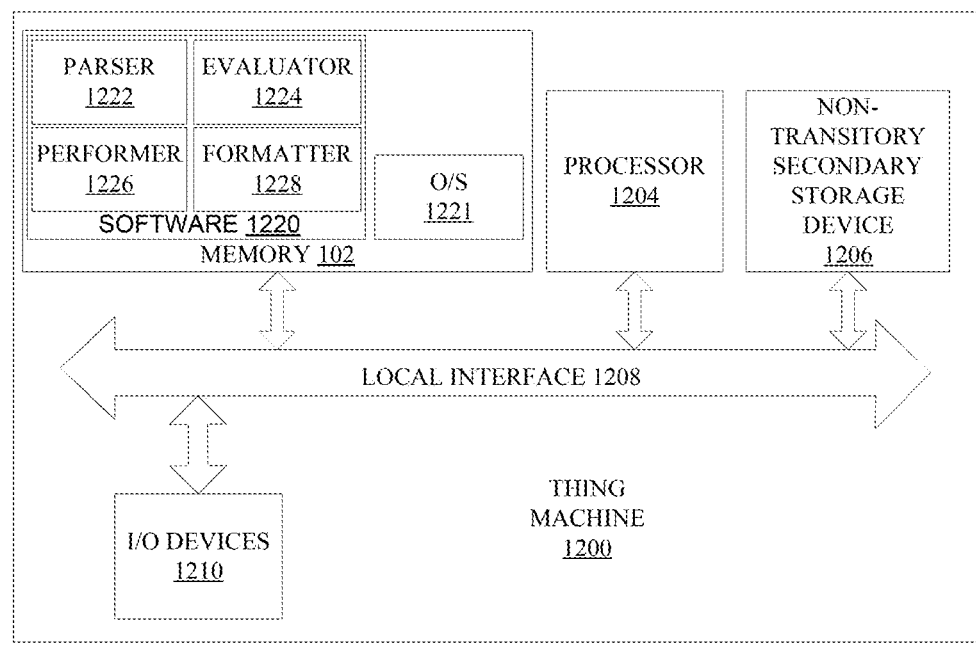
FIG. 12 is a schematic diagram illustrating parts of a Thing Machine, in accordance with one embodiment of the invention.

FIG. 12 is a schematic diagram illustrating parts of a Thing Machine 1200, in accordance with one embodiment of the invention. As shown by FIG. 2, the Thing Machine 1200 contains a memory 1202, a processor 1204, and a non-transitory secondary storage device 1206, each communicatively coupled via a local bus, or local interface 1208 allowing for communication within the Thing Machine 1200.

The memory 1202 has software 1220 stored therein that defines the functionality described herein. The Thing Machine 1200 also contains input and output (I/O) devices 110 (or peripherals). The local interface 1208 can be, for example but not limited to, one or more buses or other wired or wireless connections, as is known in the art. The local interface 1208 may have additional elements, which are omitted for simplicity, such as controllers, buffers (caches), drivers, repeaters, and receivers, to enable communications. Further, the local interface 1208 may include address, control, and/or data connections to enable appropriate communications among the aforementioned components.

The processor 1204 is a hardware device for executing software, particularly software that is stored in the memory 1202. The processor 1204 can be any custom made or commercially available single core or multi-core processor, a central processing unit (CPU), an auxiliary processor among several processors associated with the Thing Machine 1200, a semiconductor based microprocessor (in the form of a microchip or chip set), a macroprocessor, or generally any device for executing software instructions.

The memory 1202 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 1202 may incorporate electronic, magnetic, optical, and/or other types of storage media. Note that the memory 1202 can have a distributed architecture, where various components are situated remotely from one another, but can be accessed by the processor 1204.

The software 1220 defines functionality performed by the Thing Machine, in accordance with the present invention. The software 1220 in the memory 1202 may include one or more separate programs, each of which contains an ordered listing of executable instructions for implementing logical functions of the Thing Machine 1200, as described below. As an example, the software 1220 may define a parser 1222, an evaluator 1224, a performer 1226, and a formatter 1228, the functions of which are described herein.

The memory 1202 may contain an operating system (O/S) 1221. The operating system essentially controls the execution of programs within the Thing Machine 1200 and provides scheduling, input-output control, file and data management, memory management, and communication control and related services.

The I/O devices 110 may include input devices, for example but not limited to, a keyboard, mouse, scanner, microphone, etc. Furthermore, the I/O devices 110 may also include output devices, for example but not limited to, a printer, display, etc. Finally, the I/O devices 110 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system Thing Machine 1200 is in operation, the processor 1204 is configured to execute the software 1220 stored within the memory 1202, to communicate data to and from the memory 1202, and to generally control operations of the Thing Machine 1200 pursuant to the software 1220, as explained above.

When the functionality of the Thing Machine 1200 is in operation, the processor 1204 is configured to execute the software 1220 stored within the memory 1202, to communicate data to and from the memory 1202, and to generally control operations of the Thing Machine 1200 pursuant to the software 1220. The operating system 1221 is read by the processor 1204, perhaps buffered within the processor 1204, and then executed.

When the Thing Machine 1200 is implemented in software 1220, it should be noted that instructions for implementing the Thing Machine 1200 can be stored on any computer-readable medium for use by or in connection with any computer-related device, system, or method. Such a computer-readable medium may, in some embodiments, correspond to either or both the memory 1202 or the storage device 1206. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 1204 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the Thing Machine 1200 is implemented in hardware, the Thing Machine 1200 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In accordance with the first exemplary embodiment of the invention, initially, the memory 1202 contains a Thing Machine procedure P(TM) (which is an executable procedure) including a set of Thing Machine procedures P(TM (i)). One skilled in the art would understand that a multiplicity of P(TM(i)) could be embodied in a single computational machine such as, but not limited to, a Dell Latitude 15 3000 series laptop running Windows 10; embodied using a system on a chip such as a Raspberry Pi 3; embodied using a multiplicity of computational components in a single machine, or, embodied using a multiplicity of distinct and separate machines that can communicate directly or indirectly. The Thing Machine can be embodied using plug and play architecture, such as, but not limited to, defined in Plug and Play I2C slave U.S. Pat. No. 6,363,437, which is incorporated herein by reference in its entirety.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer-based method for performing a desired verb action, the method comprising the steps of:
   administering units of memory having a set of non-mutable components in a knowledge base, wherein the non-mutable components are organized as a graph of non-mutable components with nodes and edges that extend between the nodes, wherein the nodes correspond to the non-mutable components and are representative of definitional knowledge and procedural knowledge of a model, wherein the model comprises a non-mutable component representative of a vocabulary including non-mutable components representative of performable actions and non-mutable components a performable action can act upon, wherein the performable actions are processes represented by executable machine code stored in a non-transitory memory that are executed by one or more computer processors;
   locating in the vocabulary a verb satisfying a criteria of the desired verb action, said verb having a representation of a reference to a particular one of the performable actions; and
   performing the particular one of the performable actions, with the one or more computer processors, in a context of a domain of discourse, wherein the domain of discourse comprises a set of non-mutable components from the plurality of non-mutable components that the performable action can act upon,
   wherein the domain of discourse comprises the vocabulary, and wherein the context is a graph representing the non-mutable components in the domain of discourse; and
   setting the context, wherein setting the context comprises:
      in a first context, computing a non-mutable component representative of a second context;
      setting, in the second context, a graph representative of a set of non-mutable components from the first context;
      performing a second performable action in the second context to produce an output set in the second context if the second performable action is applicable across a multiplicity of domains;
      setting, in the first context, a representation of non-mutable components in the output set of the second context; and
      unsetting the second context.

2. The method of claim 1, wherein the domain of discourse further comprises a domain of definition, and a codomain,
   wherein the domain of definition comprises non-mutable components from the plurality of non-mutable components that the performable action can act upon as input, and the codomain comprises non mutable components from the plurality of non-mutable components that the performable action can act upon as output.

3. The method of claim 1, wherein the desired verb action further comprises performing the steps of:
   receiving, by interacting with an electromagnetic waveform device, a communicated communication; and
   setting a first non-mutable component to be representative of the received communication.

4. The method of claim 3, wherein the desired verb action further comprises performing the steps of:
   parsing content of the first non-mutable component representative of the received communication to compute a second non-mutable component representative of a statement in the context of the domain of discourse.

5. The method of claim 4, wherein the desired verb action further comprises performing the step of evaluating, in the domain of discourse, the second non-mutable component representative of a statement and computing a third non-mutable component representative of a performable statement in the context of the domain of discourse.

6. The method of claim 5, wherein the desired verb action further comprises performing the step of performing the third non-mutable component representative of the performable statement in the context of the domain of discourse.

7. The method of claim 6, wherein the performable statement comprises at least one of the group of a representation of a reference to the desired verb action, a set of non-mutable components in a domain of definition, and a set of non-mutable components in a codomain.

8. The method of claim 7, wherein the reference to the verb, the domain of definition, and the codomain represent a criteria for selecting a desired verb action.

9. The method of claim 5, wherein the desired verb action to perform is the verb action of the performable statement.

10. The method of claim 5, wherein the statement is representative of a request consisting of at least one of the group of a request to perform a transaction, a request to provide a service, and a request related to a good.

11. The method of claim 1, wherein the desired verb action to perform is the verb action of a performable statement.

12. The method of claim 1, wherein the desired verb action consists of at least one of performing a smart contract, learning something in a domain of discourse, learning how to do something in a domain of discourse, and learning something that can be acted upon in a domain of discourse,
wherein learning comprising performing a modeled action that changes the knowledge base.

13. The method of claim 1, wherein each respective non-mutable component comprises:
an identifier whose value distinguishes the non-mutable component from every other non-mutable component;
a value; and
a relationship set having a set of mutable relationships, each describing a relationship of the non-mutable component.

14. The method of claim 13, wherein each respective non-mutable component comprises:
a set of representations of a reference to an application specific data structure required by an implementation of an action administering the non-mutable components.

15. The method of claim 13, wherein each respective non-mutable component further comprises:
a set of attributes each describing a quality, character, or characteristic ascribed to the non-mutable component.

16. The method of claim 1, further comprising:
self-directing assembly of the vocabulary of non-mutable components with a controller that comprises a processor with a memory, a communication bus, a power source, and non-transitory computer readable.

17. The method of claim 1, wherein the knowledge base comprises a verb non-mutable component associated with the verb,
wherein the verb non-mutable component is a graph of non-mutable components related to the verb,
wherein, in the graph of non-mutable components related to the verb, each node represents a non-mutable component, and an edge from each node represents a node relationship for that node,
wherein the verb non-mutable component qualifies a non-mutable component representative of an instance of the verb,
wherein the instance of the verb has a representation of a reference to performable machine code in computer-based memory,
wherein the instance of the verb qualifies a non-mutable component representative of a domain of definition associated with the verb, and qualifies a non-mutable component representative of a co-domain associated with the verb, and
wherein the non-mutable component representative of the domain of definition qualifies a set of non-mutable components in an input set for the verb non-mutable component, and the co-domain non-mutable components qualifies an output set for the verb non-mutable component.

18. The method of claim 1, wherein administering the units of memory having the set of non-mutable components in the knowledge base comprises:
receiving a statement;
parsing the statement into a parsed non-mutable component; and
evaluating the parsed non-mutable component, wherein the evaluating comprises computing and setting the performable action.

19. The method of claim 18, wherein parsing the statement into the parsed non-mutable component is with a first verb action, evaluating the parsed non-mutable component is with a second verb action, and performing the performable action is with a third verb action.

20. The computer-based method of claim 1, further comprising:
dynamically configuring at least some of the performable actions and the non-mutable components that the performable actions can act upon.

21. The computer-based method of claim 20, wherein dynamically configuring at least some of the performable actions and the non-mutable components that the performable actions can act upon comprises:
dynamically loading, with a controller, one or more performable actions for administering the graph of non-mutable components.

22. The computer-based method of claim 21, wherein the controller self-directs the assembly of a vocabulary expressed in terms of the non-mutable components that may be performed as actions and non-mutable components that the actions can act upon.

23. A system comprising:
units of memory having a set of non-mutable components in a knowledge base wherein the non-mutable components are organized as a graph of non-mutable components with nodes and edges that extend between the nodes, wherein the nodes correspond to the non-mutable components and are representative of definitional knowledge and procedural knowledge of a model, wherein the model comprises a non-mutable component representative of a vocabulary including non-mutable components representative of performable actions and non-mutable components a performable action can act upon, wherein the performable actions are processes represented by executable machine code stored in a non-transitory memory that are executed by one or more computer processors;
a processor and a memory configured to store non-transitory instructions that, when executed by the processor, perform the steps of:
receiving a received statement;
parsing, by a first verb action represented in the graph of non-mutable components as a node that corresponds to one of the non-mutable components representative of performable actions, the received statement into a parsed non-mutable component;
evaluating, by a second verb action represented in the graph of non-mutable components as a node that corresponds to one of the non-mutable components representative of performable actions, the parsed non-mutable component using a vocabulary, further comprising the step of computing and setting a performable statement comprising a verb in the vocabulary representing a performable action; and
performing, in a context of a domain of discourse, and by a third verb action represented in the graph of non-mutable components as a node that corresponds to one of the non-mutable components representative of performable actions, the performable action upon a target non-mutable component,
wherein the vocabulary comprises a set of performable action non-mutable components and a set of target non-mutable components a performable action non-mutable components can act upon, wherein the context is a graph of non-mutable components representing the non-mutable components in the domain of discourse, setting the context, wherein setting the context comprises:

in a first context, computing a non-mutable component representative of a second context non-mutable component;

setting, in the second context non-mutable component, a graph of non-mutable components representative of a set of non-mutable components from the first context;

performing a second performable action in the second context to produce an output set in the second context if the second performable action is applicable across a multiplicity of domains;

setting, in the first context, a representation of non-mutable components in the output set of the second context; and unsetting the second context.

24. The system of claim 23, wherein the received statement is a non-mutable component of the plurality of non-mutable components expressed in a language grammar.

25. The system of claim 23, wherein the vocabulary is a non-mutable component in the plurality of non-mutable components.

26. The system of claim 23, wherein the performable statement non-mutable components is in a co-domain of a service.

27. The system of claim 23, wherein the vocabulary relates to a domain of discourse comprising a non-mutable component in the plurality of non-mutable components the performable action can act upon as an input.

28. The system of claim 23, wherein the plurality of components comprises a non-mutable component.

29. A computer-based method comprising:

administering units of memory comprising a set of non-mutable components in a knowledge base, wherein the non-mutable components are organized as a graph of non-mutable components with nodes and edges that extend between the nodes, wherein the nodes correspond to non-mutable Things and are representative of definitional knowledge and procedural knowledge of a model, wherein the model comprises a non-mutable component representative of a vocabulary including non-mutable components representative of performable actions and non-mutable components a performable action can act upon, wherein the performable actions are processes represented by executable machine code stored in a non-transitory memory that are executed by one or more computer processors;

receiving a received statement;

parsing, by a first verb action represented in the graph of non-mutable components as a node that corresponds to one of the non-mutable components representative of performable actions, the received statement into a parsed non-mutable component;

evaluating, by a second verb action represented in the graph of non-mutable components as a node that corresponds to one of the non-mutable components representative of performable actions, the parsed non-mutable component using the vocabulary, further comprising the step of:

computing and setting a performable statement non-mutable component comprising a verb in the vocabulary representing one of the performable actions; and performing, in a context of a domain of discourse, and with the one or more computer processors, by a third verb action represented in the graph of non-mutable components as a node that corresponds to one of the non-mutable components representative of performable actions, the performable action upon a target non-mutable component, wherein the context is a graph of non-mutable components representing the non-mutable components in the domain of discourse, the method further comprising setting the context, wherein setting the context comprises:

in a first context, computing a non-mutable component representative of a second context non-mutable component;

setting, in the second context non-mutable component, a graph of non-mutable components representative of a set of non-mutable components from the first context;

performing a second performable action in the second context to produce an output set in the second context if the second performable action is applicable across a multiplicity of domains;

setting, in the first context, a representation of non-mutable components in the output set of the second context; and unsetting the second context.

30. The method of claim 29, wherein the received statement is a non-mutable component of the plurality of non-mutable components expressed in a language grammar.

31. The method of claim 29, wherein the vocabulary is a non-mutable component in the plurality of non-mutable components.

32. The method of claim 29, wherein the performable statement non-mutable component is in a co-domain of a service.

33. The method of claim 29, wherein the vocabulary relates to a domain of discourse comprising a non-mutable component in the plurality of Things the performable action can act upon as an input.

34. The method of claim 29, wherein the plurality of components comprises a non-mutable component.

35. A computer-based method comprising:

storing, in a computer-based memory, a graph of non-mutable components with nodes and edges that extend between the nodes, wherein the nodes correspond to the non-mutable components and represent both definitional knowledge and procedural knowledge including performable actions and non-mutable components that the performable actions can act upon, wherein each performable action is a process performed by one or more computer-based processors executing computer-readable machine code stored in the computer-based memory;

locating, in the graph of non-mutable components, a verb satisfying a criteria of a desired verb action, said verb corresponding to a particular one of the performable actions; and performing, in a context of a domain of discourse, the particular performable action, with the one or more computer processors, wherein the context is a graph of non-mutable components representing the non-mutable components in the domain of discourse, the method further comprising setting the context, wherein setting the context comprises:

in a first context, computing a non-mutable component representative of a second context non-mutable component;

setting, in the second context non-mutable component, a graph of non-mutable components representative of a set of non-mutable components from the first context;

performing a second performable action in the second context to produce an output set in the second context if the second performable action is applicable across a multiplicity of domains;

setting, in the first context, a representation of non-mutable components in the output set of the second context; and unsetting the second context.

36. The computer-based method of claim 35, further comprising:

dynamically configuring at least some of the performable actions and the non-mutable components that the performable actions can act upon.

37. The computer-based method of claim 36, wherein dynamically configuring at least some of the performable actions and the non-mutable components that the performable actions can act upon comprises:

dynamically loading, with a controller, one or more performable actions for administering the graph of non-mutable components.

38. The computer-based method of claim 37, wherein the controller self-directs the assembly of a vocabulary expressed in terms of the non-mutable components that may be performed as actions and non-mutable components that the actions can act upon.

39. A computer-based method for performing a desired verb action, the method comprising the steps of:

administering non-mutable units of memory representative of a knowledge base organized as a graph of non-mutable components, wherein each node in the graph represents one of the non-mutable components, wherein the nodes are connected with edges, wherein at least one of the non-mutable components is representative of a vocabulary including a set of non-mutable components representative of performable verb actions, each embodied as machine code, wherein each of the non-mutable components that is representative of one of the performable verb actions is connected to a set of non-mutable components representative of nouns the performable verb action can act upon, and wherein at least one of the performable verb actions can act upon the graph of non-mutable components and cause performance of a second one of the performable verb actions, wherein the performance of the second one of the performable verb actions comprises the steps of:

locating in the vocabulary a verb satisfying a criteria as a performable verb action, and performing, in a context of a domain of discourse, the performable verb action that corresponds to the verb in a context of a domain of discourse, wherein the domain of discourse comprises a set of non-mutable components from the plurality of non-mutable components that the performable action can act upon, wherein the context is a graph of non-mutable components representing the non-mutable components in the domain of discourse, the method further comprising setting the context, wherein setting the context comprises:

in a first context, computing a non-mutable component representative of a second context non-mutable component;

setting, in the second context non-mutable component, a graph of non-mutable components representative of a set of non-mutable components from the first context;

performing a second performable action in the second context to produce an output set in the second context if the second performable action is applicable across a multiplicity of domains;

setting, in the first context, a representation of non-mutable components in the output set of the second context; and unsetting the second context.

40. The method of claim 1, wherein the non-mutable components are organized as the graph of non-mutable components that comprises a blockchain model that describes a blockchain and describes a set of tasks that can be performed to use the blockchain.

41. A method comprising:

providing a first non-mutable components Machine, a second non-mutable components Machine, and a third non-mutable components Machine, wherein each of the first non-mutable components Machine, the second non-mutable components Machine, and the third non-mutable components Machine comprises:

units of memory having a set of non-mutable components in a knowledge base, wherein the non-mutable components are organized as a graph of non-mutable components with nodes and edges that extend between the nodes, wherein the nodes correspond to the non-mutable components and are representative of definitional knowledge and procedural knowledge of a model, wherein the model comprises a non-mutable component representative of a vocabulary of non-mutable components including non-mutable components representative of performable actions and non-mutable components a performable action can act upon, wherein the performable actions are processes represented by executable machine code stored in a non-transitory memory that are executed by one or more computer processors, wherein the first non-mutable components Machine has a model of a blockchain, a model of a token, a model of a smart contract, a publication model, a validation model, and an identity model, and wherein, in a context of a domain of discourse, the first non-mutable components Machine:

performs a first one of the performable actions to format a set of non-mutable components as a content non-mutable component;

performs a second one of the performable actions to act upon the model of the token, a content, and the identity model to:

send to the model of the smart contract, a representation of the model of the token, a representation of the content, and a representation of the identity model; and receive a representation of a smart contract response from the model of the smart contract, wherein the smart contract response is content representative of an entry on the blockchain; and communicates a representation of the smart contract response to the second non-mutable components Machine, along with the content, wherein the second non-mutable components Machine:

in response to the communicated representation of the smart contract response, validates that the content is published on the blockchain; and in response to the validating, adds the content to computer readable media; and wherein the third non-mutable components Machine communicates a request for validated content to the second non-mutable components Machine, and
wherein, in response to the request for validated content, the second non-mutable components Machine:
reads the validated content from computer readable media; and
provides a response representative of the validated content,
wherein the context is a graph of non-mutable components representing the non-mutable components in the domain of discourse,
the method further comprising setting the context, wherein setting the context comprises:
in a first context, computing a non-mutable component representative of a second context non-mutable component;
setting, in the second context non-mutable component, a graph of non-mutable components representative of a set of non-mutable components from the first context;
performing a second performable action in the second context to produce an output set in the second context if the second performable action is applicable across a multiplicity of domains;
setting, in the first context, a representation of non-mutable components in the output set of the second context; and
unsetting the second context.

\* \* \* \* \*